(12) United States Patent
Wood et al.

(10) Patent No.: US 10,564,001 B2
(45) Date of Patent: Feb. 18, 2020

(54) NAVIGATION SYSTEM WITH ROUTE DISPLAYING MECHANISM AND METHOD OF OPERATION THEREOF

(71) Applicant: Telenav, Inc., Santa Clara, CA (US)

(72) Inventors: Eric Wood, Menlo Park, CA (US); Kok Wei Koh, Mountain View, CA (US); Herman Ho-Man So, Redwood City, CA (US)

(73) Assignee: Telenav, Inc., Santa Clara, CA (US)

( * ) Notice: Subject to any disclaimer, the term of this patent is extended or adjusted under 35 U.S.C. 154(b) by 134 days.

(21) Appl. No.: 15/845,667

(22) Filed: Dec. 18, 2017

(65) Prior Publication Data
US 2018/0188067 A1 Jul. 5, 2018

Related U.S. Application Data

(60) Provisional application No. 62/440,623, filed on Dec. 30, 2016.

(51) Int. Cl.
*G01C 21/36* (2006.01)

(52) U.S. Cl.
CPC ..... *G01C 21/3676* (2013.01); *G01C 21/3602* (2013.01); *G01C 21/365* (2013.01); *G01C 21/3673* (2013.01); *G01C 21/3694* (2013.01)

(58) Field of Classification Search
CPC ............ G01C 21/3676; G01C 21/3697; G01C 21/3694; G01C 21/3602; G01C 21/3673; G01C 21/365
USPC ........................................................ 701/428
See application file for complete search history.

(56) References Cited

U.S. PATENT DOCUMENTS

| | | | |
|---|---|---|---|
| 8,521,411 B2 | 8/2013 | Grabowski et al. | |
| 8,977,489 B2 | 3/2015 | Szczerba et al. | |
| 2010/0042953 A1* | 2/2010 | Stewart | G06F 3/0482 715/854 |
| 2010/0292886 A1 | 11/2010 | Szczerba et al. | |
| 2011/0093190 A1 | 4/2011 | Yoon | |
| 2011/0144904 A1* | 6/2011 | Pinkus | G01C 21/362 701/533 |
| 2012/0224060 A1 | 9/2012 | Gurevich et al. | |

(Continued)

FOREIGN PATENT DOCUMENTS

| | | |
|---|---|---|
| JP | 2012154837 A | 8/2012 |
| WO | 2010071382 A2 | 6/2010 |

OTHER PUBLICATIONS

Pioneer Corporation, internet webpage for product and titled "AVIC-VH99HUD/AVIC-ZH99HUD", website checked Oct. 3, 2017, Japan, http://pioneer.jp/carrozzeria/cybernavi/avic-vh99hud_avic-zh99hud/.

*Primary Examiner* — Muhammad Shafi
(74) *Attorney, Agent, or Firm* — Perspectives Law Group, Corp.

(57) ABSTRACT

A method of operation of a navigation system comprising: determining a node including a node attribute for a maneuver along a path; determining a node presentation based on the node attribute including a node proximity meeting or exceeding a node relevance threshold; generating a route bar including the node based on the node presentation, the node proximity, or a combination thereof; determining a safe location with a control unit for displaying the route bar based on a current surrounding for presenting on a device.

20 Claims, 10 Drawing Sheets

(56) References Cited

U.S. PATENT DOCUMENTS

2013/0253811 A1* 9/2013 Miyajima ............ G08G 1/0112
701/118
2014/0156133 A1* 6/2014 Cullinane ............. B60W 30/00
701/23

* cited by examiner

NAVIGATION SYSTEM WITH ROUTE DISPLAYING MECHANISM AND METHOD OF OPERATION THEREOF

CROSS-REFERENCE TO RELATED APPLICATION(S)

This application claims the benefit of U.S. Provisional Patent Application Ser. No. 62/440,623 filed Dec. 30, 2016, and the subject matter thereof is incorporated herein by reference thereto.

TECHNICAL FIELD

An embodiment of the present invention relates generally to a navigation system, and more particularly to a system with a route displaying mechanism.

BACKGROUND ART

Modern consumer and industrial electronics, especially devices such as graphical navigation systems, televisions, projectors, cellular phones, portable digital assistants, automobiles, and combination devices, are providing increasing levels of functionality to support modern life including location-based information services. Research and development in the existing technologies can take a myriad of different directions.

As users become more empowered with the growth of mobile technology, new and old paradigms begin to take advantage of this new space. One such space is regarding the use of location and navigating to that location.

Thus, a need still remains for a navigation system with a route displaying mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining a node including a node attribute for a maneuver along a path; determining a node presentation based on the node attribute including a node proximity meeting or exceeding a node relevance threshold; generating a route bar including the node based on the node presentation, the node proximity, or a combination thereof; determining a safe location with a control unit for displaying the route bar based on a current surrounding for presenting on a device.

An embodiment of the present invention provides a navigation system, including: a control unit configured to; determine a node including a node attribute for a maneuver along a path, determine a node presentation based on the node attribute including a node proximity meeting or exceeding a node relevance threshold, generate a route bar including the node based on the node presentation, the node proximity, or a combination thereof, determine a safe location for displaying the route bar based on a current surrounding for presenting on a device; and a communication interface, coupled to the control unit, for communicating the safe location for displaying on a device.

An embodiment of the present invention provides a non-transitory computer readable medium including instructions for a navigation system, including: determining a node including a node attribute for a maneuver along a path; determining a node presentation based on the node attribute including a node proximity meeting or exceeding a node relevance threshold; generating a route bar including the node based on the node presentation, the node proximity, or a combination thereof; determining a safe location for displaying the route bar based on a current surrounding for presenting on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
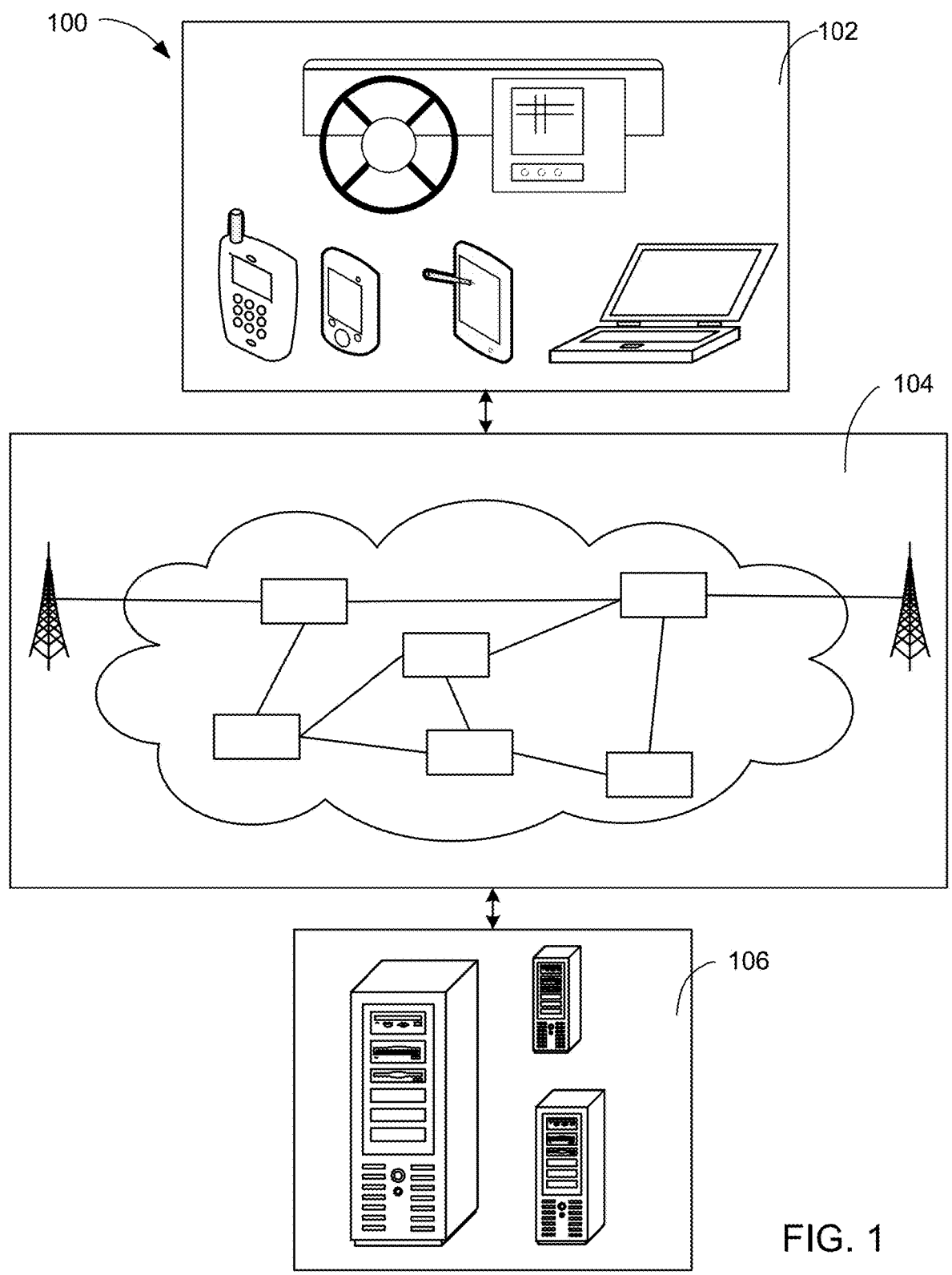
FIG. 1 is a navigation system with a route displaying mechanism in an embodiment.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with an output control mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further can be separate from or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with the vehicle, such as the car, the truck, the bus, or the train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
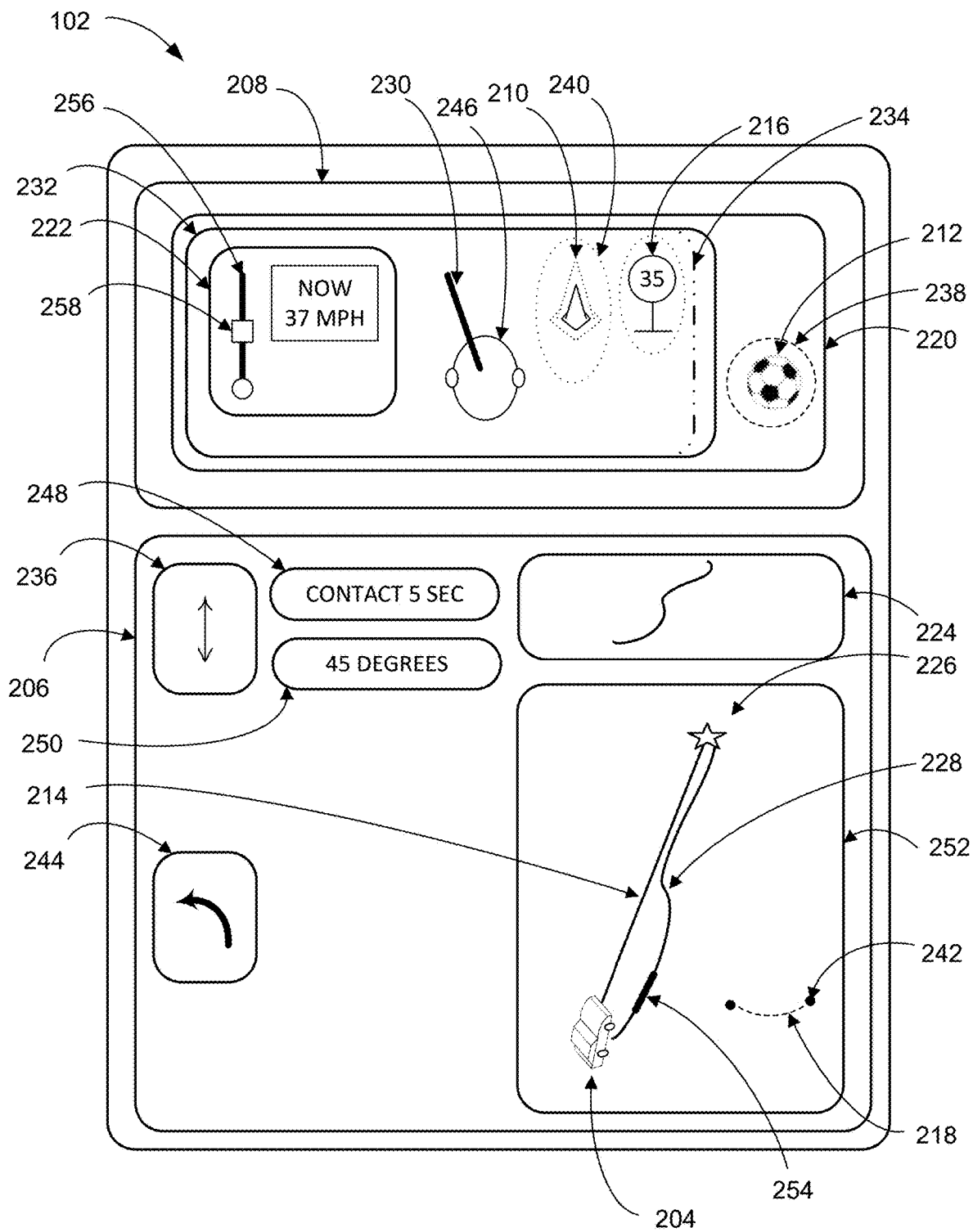
FIG. 2 is an example of the first device in an embodiment.

Referring now to FIG. 2, therein is shown an example of the first device 102. FIG. 2 depicts the first device 102 in an embodiment. In this example, the first device 102 is shown as a portion of a vehicle 204. As a specific example, embodiment of FIG. 2 depicts a portion of a dashboard 206 and a windshield 208 of the vehicle 204. The vehicle 204 is a carrier used for transportation. For example, the vehicle can be a car, truck, bus, train, vessel, or a combination thereof. The windshield 208 is defined as the medium that protects an occupant of the vehicle 204. For example, the windshield 208 can be the glass placed in direction of travel from the point of view of the occupant. For a specific example, the windshield 208 can be made of various materials including glass, metal, organic material, or a combination thereof. The windshield 208 does not necessary have a specified shape and can be flat, curved, include protrusion, or a combination thereof. The windshield 208 can be a medium for projecting information for navigation, for example, a projection surface. Alternatively, the windshield 208 can be a medium for generating the information for navigation in the medium itself.

This embodiment further depicts various types of a supplement 210. The supplement 210 is defined as a representation of an information regarding an item 212 viewed through or shown on the windshield 208, the information relevant to the vehicle 204 in the physical world, or a combination thereof. The supplement 210 can represent a visual enhancement to the item 212 viewed through the windshield 208 or its status. The item 212 is defined as an object in the real world. As a specific example, the supplement 210 can represent the visual enhancement of a traffic cone as shown in FIG. 2 on a road 254, highlighting of a traffic sign 216 also shown in FIG. 2 representing a speed limit sign, the speed limit of a path 218 applicable to the vehicle 204, the current speed of the vehicle 204, or a combination thereof. The path 218 is defined as a passage connecting one instance of a physical location 242 to another instance of the physical location 242. The road 254 is defined as the path 218 between multiple instances of the physical location 242 for the vehicle 204 to traverse in the physical world.

The physical location 242 can be identified by a positional data. For example, the physical location 242 can represent the geographical position of an object, a building, a person, or a combination thereof in the physical world. For example, the physical location 226 can be represented by a geographic latitude and longitude based on a Cartesian coordinate system. In a different example, the physical location 242 can be represented by a mailing address.

The supplement 210 can be depicted in a number of ways. For example, the supplement 210 can be projected onto the windshield 208 as a head up display (HUD) 220. The HUD 220 is defined as a device for displaying information. In this example, the windshield 208 can be a transparent projection surface for projecting images. In a different example, the windshield 208 can be a transparent monitor for displaying the images on the windshield 208 itself.

An abbreviated view 222 is defined as a reduced map information 224 of a full map information 226, as shown on the dashboard 206. The navigation route 228 is defined as the path 218 determined for the vehicle 204 to traverse. The abbreviated view 222 allows a user to quickly assess information about the navigation route 228 to be traversed. A travel path 214 can represent the abbreviated view 222 of the navigation route 228. The navigation route 228 can represent the path 218 for the vehicle 204 or the operator 246 to traverse to reach the destination.

The full map information 226 is defined as an information of the particular geographical area. The reduced map information 224 is defined as a scaled down information of the full map information 226 of the particular geographical area.

The navigation route 228 can be presented at a safe location 232 of the vehicle 204. The safe location 232 is defined as a position on the windshield 208 where a driver or a passenger can quickly find and view the supplement 210, a route bar 256, or a combination thereof without diverting attention from the road 254 for an extended period, such as less than 3 seconds.

The route bar 256 is defined as the depiction of the navigation route 228 utilizing an abbreviated view 222. The route bar 256 can include various information of the navigation route 228. For example, the route bar 256 can include the navigation route 228, an indicator 304 for the navigation route 228, a node 258, or a combination thereof. The indicator 304 is defined as a graphical representation of the path 218 for the vehicle 204 to traverse. The node 258 is defined as the point along the path 218 for the vehicle 204 to traverse. For example, the node 258 can represent the physical location 242 along the navigation route 228 for the vehicle 204 to traverse. A maneuver 244 is defined as a movement. For example, the maneuver 244 can be a motion for transitioning the speed of the vehicle 204, change the direction of the movement of the vehicle 204, such as turning right, left, make a U-turn, or a combination thereof.

A view adjustment 234 is defined as the modifying of the displaying condition of the travel path 214. For example, the view adjustment 234 can change the depiction of the travel path 214. For a specific example, the view adjustment 234 can change or set the brightness or translucence of the depiction of the travel path 214, the navigation route 228, the supplement 210, or a combination thereof. Furthermore, the view adjustment 234 can change or set the contrast or color or size or thickness or animation of portions of the depiction of the travel path 214, the navigation route 228, the supplement 210, or a combination thereof relative to other portions of the depiction.

In a different example, the view adjustment 234 can be used to change or set the contrast of at least a portion of the depiction of the travel path 214, the route bar 256, or the supplement 210 relative to what is shown through the windshield 208. In a further example, the view adjustment 234 can be used to change or set an orientation 236 of the depiction of the travel path 214, the route bar 256, the supplement 210, or a combination thereof. The orientation 236 is defined as a position in relation to true north to points on a compass, or a specific place or object, or a combination thereof. For example, the orientation 236 can be vertical relative to the dashboard 206, horizontal relative to the dashboard, diagonal orientation relative to the dashboard 206, relative along the road 254 being traversed, relative along the point of interest (POI), or relative to the earth north.

As a further example, the view adjustment 234 can be used to change or set the curvature of the depiction of the travel path 214. As a specific example, the view adjustment 234 can set the depiction to be linear based on the curvature of the windshield. Also, as a specific example, the view adjustment 234 can be set to compensate for the shape of the windshield 208 such that the depiction of the travel path 214 appears to be linear.

Regarding the safe location 232 in this embodiment shown in FIG. 2, the safe location 232 is shown at the left portion of the windshield 208 and also left of where an operator 246 is located. The operator 246 is defined as the person controlling the movement of a vehicle 204. The safe location 232 can be adjusted. A view adjustment 234 can change or position the safe location 232 on the windshield 208. For example, the view adjustment 234 can change or position the safe location 232 to be in front of the driver. Also for example, the view adjustment 234 can change or position the safe location 232 to be between the operator 246 and the front passenger.

The view adjustment 234 can change or set the safe location 232 dynamically along the windshield 208. The view adjustment 234 can move the safe location 232 depending on the curvature of the road 254 so as to place the depiction of the travel path 214 with a predetermined distance from where the eye of the operator 246 is looking. The view adjustment 234 can move the safe location 232 based on other instances of the supplement 210. As an example, if one or more of the supplement 210 indicate an emergency 238 or an urgent view 240, and the attention of the operator 246 is not towards that portion of the windshield 208, then the safe location 232 can be dynamically moved to a position visible to the operator 246 based on tracking a direction of the eye of the operator 246. The operator 246 is defined as the person performing to operate the vehicle 204.

The emergency 238 is defined as a condition in the physical world requiring an immediate action by the operator 246. The urgent view 240 is defined as a condition requiring immediate attention by the operator 246.

A supplement presentation threshold 248 is defined as the metric used for comparison to display the supplement 210. For example, the supplement presentation threshold 248 can include the list of the item 212, the distance associated with the item 212, or a combination thereof. For a specific example, the supplement presentation threshold 248 can include "pedestrian" as the item 212 and the distance of "400 feet" associated with the pedestrian. In a different example, the supplement presentation threshold 248 can include "Traffic Sign" as the item 212 and the distance of "1000 feet" associated with the traffic sign 216.

A safe peripheral vision 250 is defined as a discernable view around the central area of focus. For example, the safe peripheral vision 250 can be measured based on an angle from the central area of focus, for example, 15 degrees.

The map 252 is defined as a graphical representation of the physical world. For example, the map 252 can be a representation of a spatial relationship between the features of the geographic locations that the map 252 represents.

Figure 3:
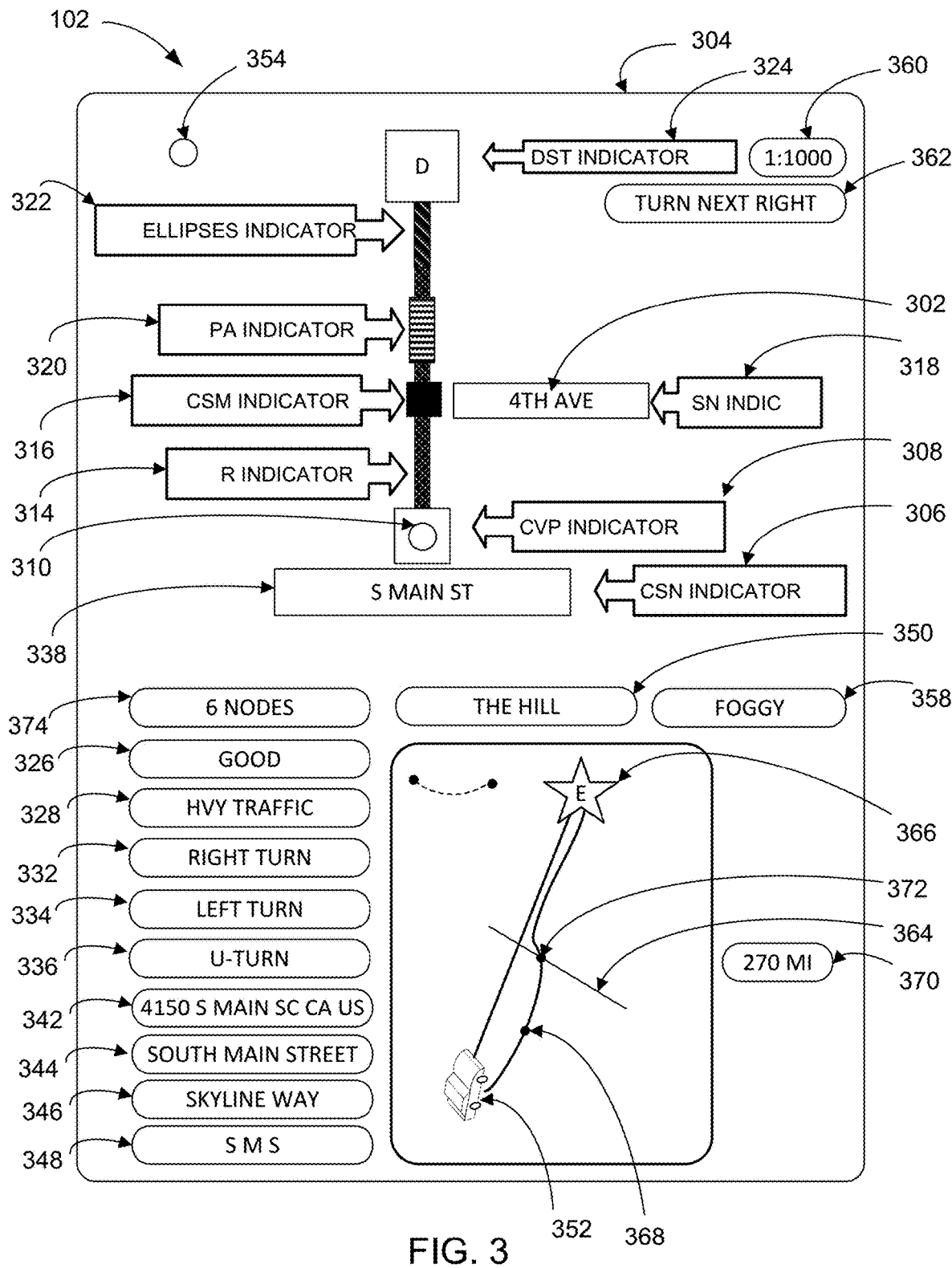
FIG. 3 is an example of a more detailed view of the travel path in an embodiment.

Referring now to FIG. 3, therein is shown a more detailed view of the travel path 214 of FIG. 2 in the embodiment of FIG. 2. The travel path 214 can be depicted in a number of ways with various types of the indicator 304 and the node 258 of FIG. 2. The indicator 304 can represent an information along the navigation route 228 of FIG. 2 for the vehicle 204 of FIG. 2 to traverse. The node 258 can represent the physical location 242 of FIG. 2 where the vehicle 204 has option to maneuver 244 of FIG. 2 along the travel path 214, the navigation route 228, or a combination thereof.

For example, the embodiment shows the indicator 304 including a current street name (CSN) indicator 306, a current vehicle position (CVP) indicator 308, a route indicator 314, a cross-street maneuver (CSM) indicator 316, a street name (SN) indicator 318, a path attribute (PA) indicator 320, an ellipses (ELS) indicator 322, and a destination (DST) indicator 324. These are examples of some of the indicator 304 that can be depicted for the travel path 214. Also, a portion of the indicator 304 can be optional and not necessarily depicted for the travel path 214.

The indicator 304 can be adjusted with the view adjustment 234 of FIG. 2. The position of the indicator 304 can also be adjusted relative to the travel path 214 with the view adjustment 234.

The current street name indicator 306 can represent an identifying information 338 about the road 254 or the path 218 of FIG. 2 the vehicle is currently on or traversing. For example, the current street name indicator 306 can represent a street name 302. The current street name indicator 306 can be represented by text, symbol, or a combination thereof.

The street name 302 is defined as the identifying information 338 of the road 254 or the path 218 for the vehicle 204 to traverse. For example, the identifying information 338 can be a full road name 344 or a full path name 346 or an abbreviated name 348 or a locally recognizable nickname 350.

The full road name 344 is defined as the identification of the road 254 of FIG. 2. The full path name 346 is defined as the identification of the path 218. The abbreviated name 348 is defined as the shortened form of identification by omitting or abbreviating portion or portions of the full form. The locally recognizable nickname 350 is defined as the identification recognizable locally in a particular region or place.

The current vehicle position indicator 308 can provide a relative location 352 of the vehicle 204 or device in the travel path 214. For example, the current vehicle position indicator 308 can provide the relative location 352 of the vehicle 204 at the physical location 242 representing a current vehicle position 310 in relation to other locations on a map 252, the route bar 256 of FIG. 2, the navigation route 228, or a combination thereof. The current vehicle position 310 is defined as present geographic position information of the first device 102.

The current vehicle position indicator 308 can provide an anchoring point 354 which can be fixed where a travel path content 358 for the travel path 214 are depicted and updated relative to this point. The current vehicle position indicator 308 can serve as the anchoring point 354 even if there is no graphical depiction of the current vehicle position indicator 308 to ease the amount of the indicator 304 needed to be displayed and absorbed by the operator 246. The relative location 352 is defined as a point or place in relation to another point, of the physical world or place or the path 218.

The anchoring point 354 is defined as a reference for other information to be updated in relation to its location. The travel path content 358 is defined as an information of the object or place in the real world related to the navigation route 228.

The route indicator 314 can represent a portion of the navigation route 228 between multiple instances of the node 258, between the current vehicle position indicator 308 and the node 258, between the node 258 and the destination indicator 324, or a combination thereof. The route indicator 314 is a representation of the path 218 in the physical world for the vehicle 204 or a person to traverse.

The cross-street maneuver indicator 316 can represent a potential maneuver 332 or a planned maneuver 334 at the node 258 representing an intersection 372. The cross-street maneuver indicator 316 can represent the type of the maneuver 244 planned at the instance of the node 258 representing the intersection 372, such as right turn, left turn, U-turn, exit ramp, entrance ramp, or rest parking. A cross-street 364 is defined as the street intersecting the path 218. The cross-street maneuver indicator 316 can also represent a prohibited maneuver 336 at the intersection 372. The term "street" is used for naming convenience although it is understood that this does not have to be the cross-street 364, as some of the examples noted earlier.

The street name indicator 318 can represent an identifying information 338 of the street. For example, similar to the current street name indicator 306, the street name indicator 318 can be represented by text, symbol, or a combination thereof. Also for example, the street name indicator 318 can include the full path name 346, the abbreviated name 348, the locally recognizable nickname 350, or a combination thereof of the street.

The path attribute indicator 320 can represent information of the path attribute 328. For example, the path attribute indicator 320 can represent a path condition 326 or other information for that portion of the path 218 or along the portion of the path 218. More will be described later.

The path attribute 328 is defined as the information of the path 218 between multiple instances of the node 258. The path condition 326 is defined as state of the path 218 affecting the vehicle 204 for traversing the path 214.

The ellipses indicator 322 can represents the section of the road 254 consolidated. For example, the ellipses indicator 322 can represent portion of the navigation route 228, the path 218 ahead of the vehicle 204, or a combination thereof not depicted on the route bar 256. For example, the ellipses indicator 322 can represent the section of the road 254 consolidated depending on the size and a presentation scale 360 of the depiction of the navigation route 228, the path 218 ahead of the vehicle 204, or a combination thereof to the destination indicator 324 not shown on the embodiment.

The presentation scale 360 is defined as the ratio between the size in the physical world and the size of the depiction. For a specific example, the presentation scale 360 of "1:1000" of FIG. 3 can represent the size of the depiction of the route bar 256, the supplement 210, or a combination thereof to be 1/1000 times the size in the physical world.

The destination indicator 324 can represent a destination point 366 or a waypoint 368 of a particular journey represented by the travel path 214. The destination indicator 324 can also represent the identifying information 338 about the instance of the node 258, which in this case is the destination point 366 or the waypoint 368.

For example, similar to the current street name indicator 306, the destination indicator 324 can be represented by text, symbol, or a combination thereof. In a different example, the destination indicator 324 can represent the full address or the full path name 346 or the abbreviated name 348 or the locally recognizable nickname 350.

As the first device 102 of FIG. 2, such as the vehicle 204 traverses the navigation route 228 in the real-world, the travel path 214 can be animated to represent a forward motion of the first device 102. As such, the current street name indicator 306, the current vehicle position indicator 308, the route indicator 314, the cross-street maneuver indicator 316, the street name indicator 318, the path attribute indicator 320, the ellipses indicator 322, the destination indicator 324, or a combination thereof can be updated, added, removed, or a combination thereof.

Also, the travel path 214 can change the presentation scale 360 or show different distances of the navigation route 228 based on a number of factors, for example, the relationship between the distance of the navigation route 228 and the size of the windshield of FIG. 208. The presentation scale 360 of the travel path 214 or the depiction of the travel path 214 can be done automatically or manually.

For a different example, one factor can include the amount of the information or difference in the information for the path attribute indicator 320 for any particular instance of the route indicator 314. The greater the amount of the information or more critical the information, the travel path 214 can increase the presentation scale 360 of the display to more clearly show the information for the path attribute indicator 320 while decreasing the presentation scale 360 of the depiction of the travel path 214 to show less or less distance of the real-world instance of the navigation route 228.

Also for example, the animation of the cross-street maneuver indicator 316 can be shown while executing that particular instance of the maneuver 244 and details of that physical location 242 can be shown as opposed to the travel path 214 in the zoom level before executing that particular instance of the maneuver 244.

Further, for example, the type of the cross-street 364 for the cross-street maneuver indicator 316 can also change the depiction of the travel path 214. As a specific example, the cross-street 364 can be the intersection 372 shaped "T" and require special attention for safety reasons.

The travel path 214 can be shown with the destination indicator 324 removed if the destination point 366 or the waypoint 368 is no longer in a reachable range 370. The reachable range 370 is defined as a distance that can be traversed by the vehicle 204. An example of this situation is if the vehicle 204 does not have sufficient amount of a fuel to reach the destination point 366. Another example can include the destination point 366 as a moving object, such as another instance of the vehicle 204, and the physical location 242 of the vehicle 204 cannot be ascertained or is out of range for the fuel remaining in the vehicle 204. Yet, another example can include that the vehicle did not follow the navigation guidance 362 per the instructions provided with the cross-street maneuver indicator 316 and the vehicle 204 of FIG. 2 has to re-route. Continuing with this example, if the destination indicator 324 is removed from depiction of the travel path 214 because the destination point 366 is no longer in the reachable range 370, then the ellipses indicator 322 can be added to the travel path 214.

Figure 4:
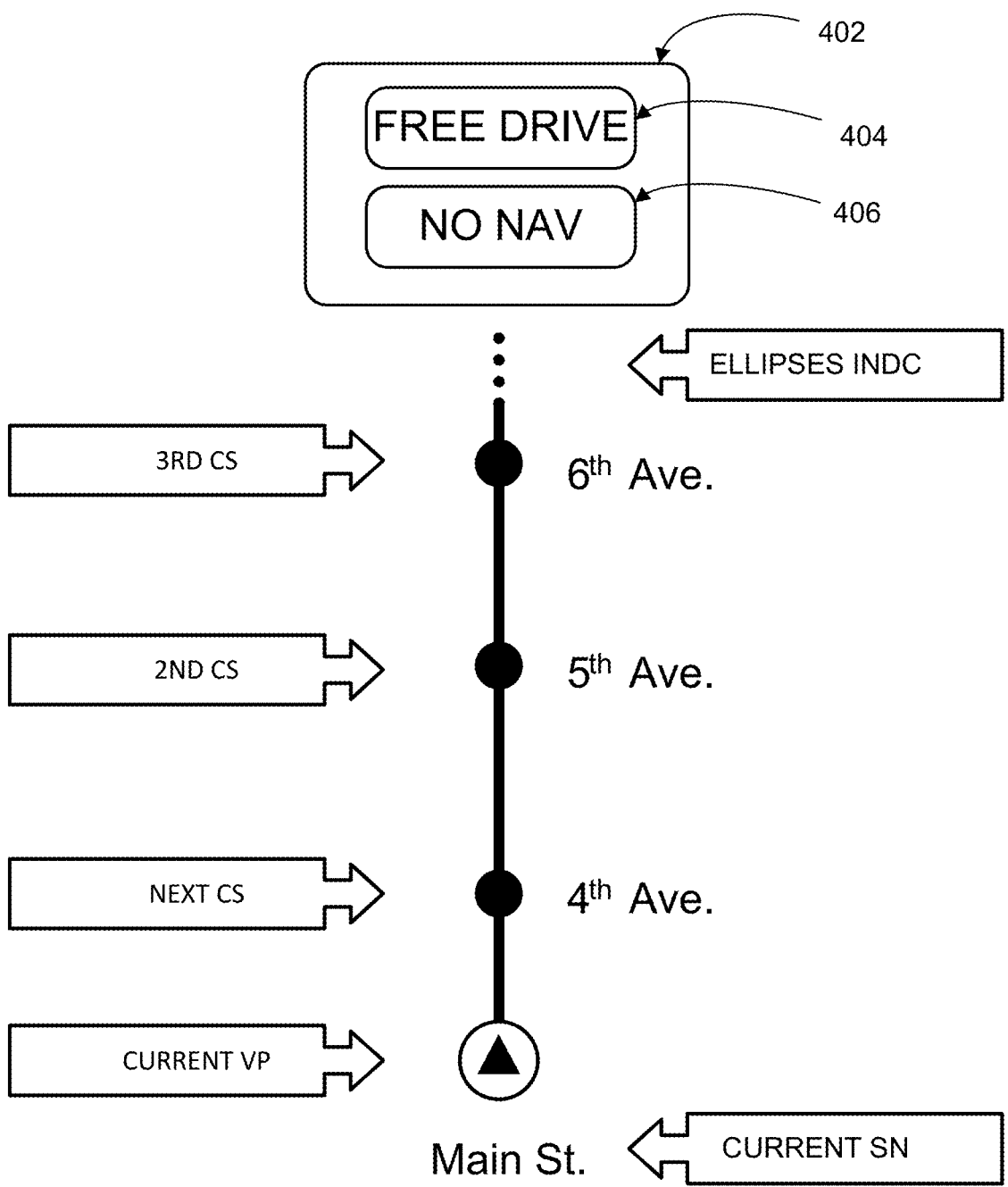
FIG. 4 is an example of the travel path in a free drive mode in an embodiment.

Referring now to FIG. 4, therein is shown an example of the route bar 256 of FIG. 2 including the travel path 214 of FIG. 2 in a free drive mode 404 in the embodiment of FIG. 2. In this example, the embodiment depicts the travel path 214 with the current street name indicator 306 of FIG. 3 as "Main St." The embodiment is also depicted with a symbol for the current vehicle position indicator 308 of FIG. 3. Also, there are three instances of the node 258 of FIG. 2 for the cross-street 364 of FIG. 3. Each of the cross-street 364 are labeled with the cross-street maneuver indicator 316 of FIG. 3 as shown with the street name indicator 318 of FIG. 3 "$4^{th}$ Ave.," "$5^{th}$ Ave.," and "$6^{th}$ Ave."

In this example, the embodiment is in the free drive mode 404 as an operation mode 402. The operation mode 402 is defined as a method of operating the navigation system 100. For example, the operation mode 402 can represent the operations of the first device 102 of FIG. 2. The operation mode 402 can affect the depiction of the travel path 214. The free drive mode 404 represents the operation mode 402 where the first device 102 such as the vehicle 204 of FIG. 2 is being operated without an active navigation session 406. In other words, the operator 246 of FIG. 2 can operate the vehicle 204 without the navigation route guidance assistance and the navigation guidance 362 of FIG. 3 selected by the operator 246, or at least without the navigation system 100 associated with the vehicle 204.

The active navigation session 406 is defined as the navigation system 100 providing a navigation guidance 362 for navigation to reach the destination point 366 of FIG. 3. The navigation guidance 362 is defined as a direction for the operator 246 to maneuver 244 the vehicle 204 for traversing the navigation route 228 of FIG. 2.

While in the free drive mode 404 as the operation mode 402, the cross-street maneuver indicator 316 for each of the node 258 displayed with the travel path 214 does not depict the maneuver 244 of FIG. 2 including the planned maneuver 334 of FIG. 3 or the potential maneuver 332.

The travel path 214 in this embodiment also depicts the route indicator 314 of FIG. 3 between the node 258. The route indicator 314 is also shown between the current vehicle position indicator 308 and the cross-street maneuver indicator 316 with the street name indicator 318 labeled "$4^{th}$ Ave." After the cross-street maneuver indicator 316 with the street name indicator 318 labeled "$6^{th}$ Ave.," the ellipses indicator 322 of FIG. 3 is shown to indicate that there can be more of the navigation route 228 not depicted by the travel path 214. Also, the destination indicator 324 of FIG. 3 is not depicted since the operation mode 402 is in the free drive mode 404 and the destination point 366 or the waypoint 368 of FIG. 3 is not necessarily known by the navigation system 100.

Figure 5:
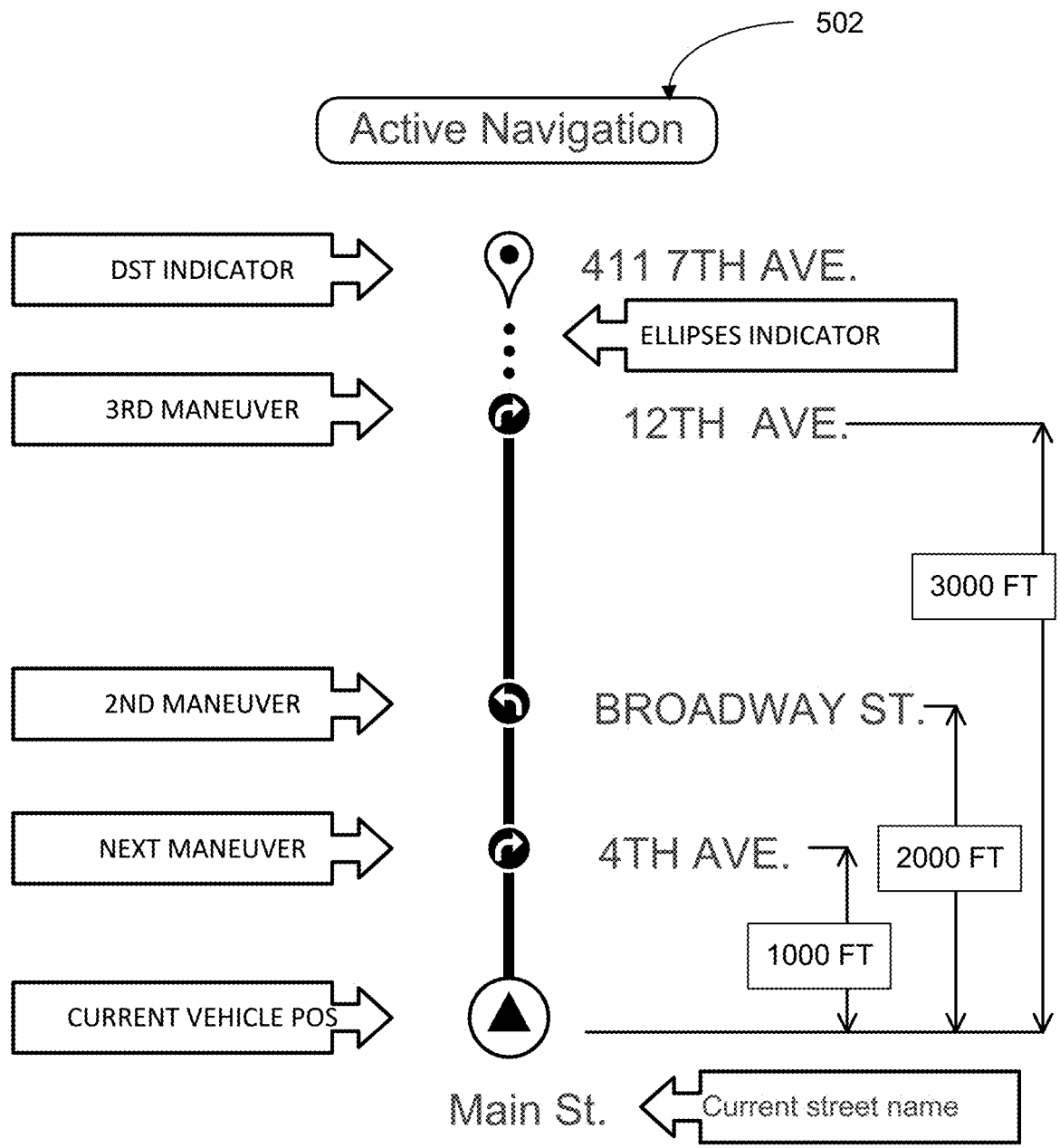
FIG. 5 is an example of the travel path in a navigation mode in an embodiment.

Referring now to FIG. 5 is an example of the travel path 214 of FIG. 2 in a navigation mode 502 as the operation mode 402 of FIG. 4 in the embodiment of FIG. 2. The navigation mode 502 is defined as the first device 102 of FIG. 1, such as the vehicle 204 of FIG. 2 operating in the active navigation session 406 of FIG. 4 providing the navigation guidance 362 of FIG. 3.

In this example, the embodiment depicts the travel path 214 with the current street name indicator 306 of FIG. 3 as "Main St." The travel path 214 is also depicted with the current vehicle position indicator 308 of FIG. 3. Also, there are three instances of the node 258 of FIG. 2 for the cross-street 364 of FIG. 3. Each of the cross-street 364 are labeled with the cross-street maneuver indicator 316 of FIG. 3, as shown with the street name indicator 318 of FIG. 3 "4$^{th}$ AVE.," "Broadway St.," and "12TH Ave." The travel path 214 is depicted with the destination indicator 324 of FIG. 3 labeled "411 7TH Ave."

While in the navigation mode 502, the travel path 214 is depicted with the destination indicator 324 and the cross-street maneuver indicator 316 for each of the node 258 and is depicted with the planned maneuver 334 of FIG. 3 or the potential maneuver 332 of FIG. 3. The street name indicator 318 labeled "4$^{th}$ Ave." depicts the cross-street maneuver indicator 316 as a right turn. The street name indicator 318 labeled "Broadway St." depicts the cross-street maneuver indicator 316 as a left turn. The street name indicator 318 labeled "12TH Ave." depicts the cross-street maneuver indicator 316 as a right turn. Although the travel path 214 shows different turns, the entire length of the depicted portion of the travel path 214 is linear from the current vehicle position indicator 308 through all the node 258 and the route indicator 314 of FIG. 3 to the destination indicator 324. In addition, the ellipses indicator 322 is shown in this embodiment of the travel path 214 between the node 258 for the 12th Ave and the destination point 366.

Figure 6:
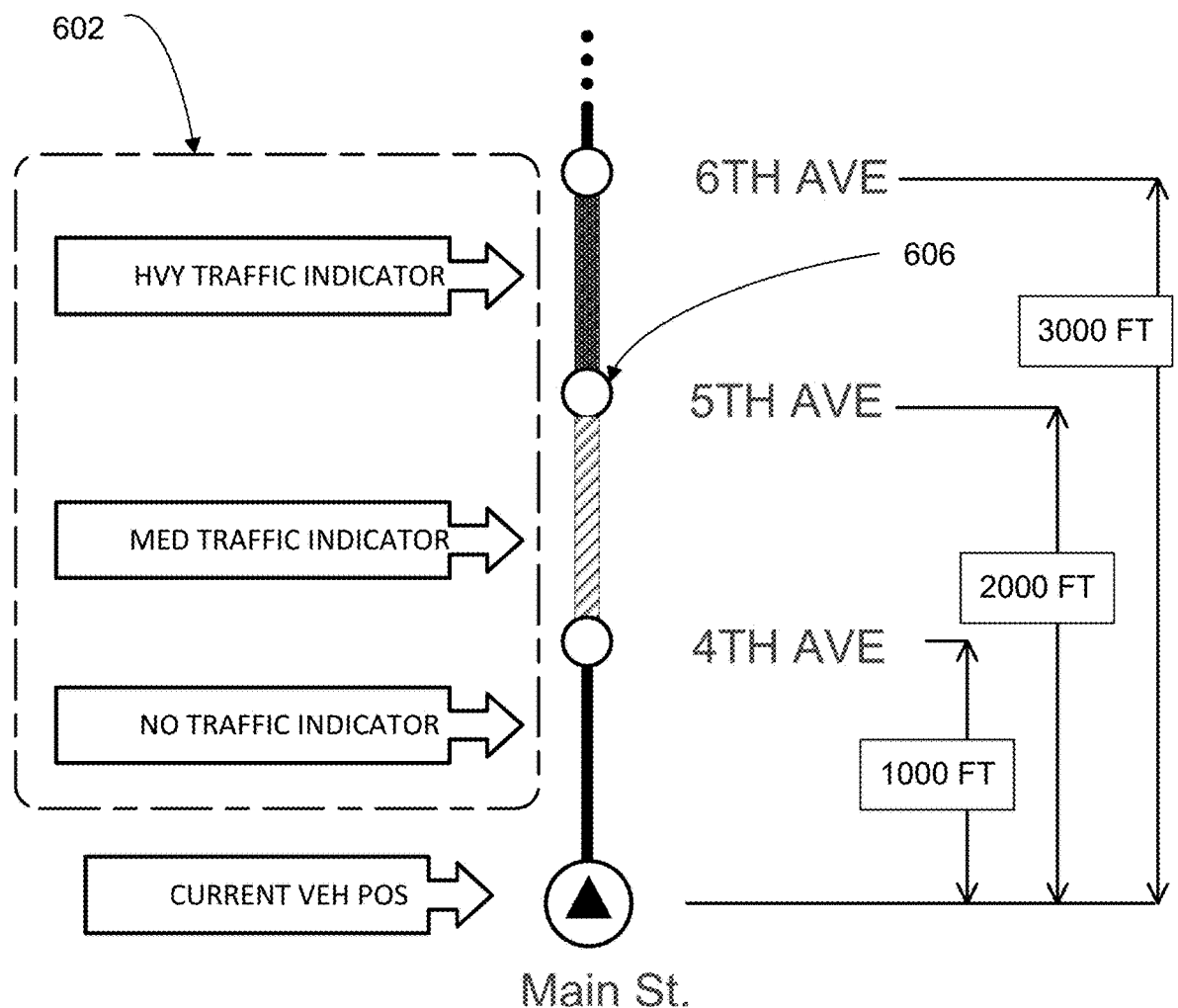
FIG. 6 is an example of the travel path including the path attribute indicator in an embodiment.

Referring now to FIG. 6, therein is shown an example of the travel path 214 of FIG. 2 including the path attribute indicator 320 of FIG. 3 in the embodiment. In this example, the embodiment depicts the travel path 214 with the free drive mode 404 of FIG. 4 as the operation mode 402 of FIG. 4.

The travel path 214 in this depiction has similarities to the travel path 214 depicted in FIG. 4. The travel path 214 is shown with the current street name indicator 306 of FIG. 3 as "Main St." The travel path 214 is also depicted with the current vehicle position indicator 308 of FIG. 3. Also, there are three instances of the node 258 for cross-street 364 of FIG. 3. Each of the cross-street 364 are labeled with the cross-street maneuver indicator 316 of FIG. 3, as shown with the street name indicator 318 of FIG. 3 "4$^{th}$ Ave.," "5$^{th}$ Ave.", and "6$^{th}$ Ave." The travel path 214 also depicts the ellipses indicator 322 of FIG. 3 shown to indicate that there can be more of the navigation route 228 of FIG. 2 not depicted by the travel path 214. Also, the destination indicator 324 of FIG. 3 is not depicted since the operation mode 402 is in free drive mode 404 and the destination point 366 of FIG. 3 or the waypoint 368 of FIG. 3 is not necessarily known by the navigation system 100.

The depiction of the travel path 214 can depict the path attribute 328 along the route indicator 314 of FIG. 3 between some of the node 258 of FIG. 2. In this example of an embodiment, the path attribute 328 depicts a traffic condition 602 along the travel path 214. The traffic condition 602 is defined as a traffic status of the path 214. For example, the traffic condition 602 can represent the path 214 with a traffic pattern or a traffic congestion including a heavy traffic, a medium traffic, no traffic, or a combination thereof. Different types of distinguishing feature such as color or graphic pattern can be used to show different types of the traffic pattern or the traffic congestion. The distinguishing feature can provide visually recognizable difference differentiating the path attribute 328 of FIG. 3.

For this example, the route indicator 314 between the node 258 with the street name indicator 318 labeled "4$^{th}$ Ave." and "5$^{th}$ Ave." is shown with the different types of the information for the path attribute indicator 320. This instance of the path attribute 328, for example, shows the medium traffic and heavy traffic. Continuing with this example, the route indicator 314 following the previously mentioned instance shows the path attribute 328 for heavy traffic.

A node presentation 606 is defined as a manner or style for displaying the node 258. For example, the node presentation 606 can provide a color, a shape, or a combination thereof for displaying the node 258.

A node relevance threshold 734 is defined as a metric used for comparison to determine the node presentation 606. For example, the node relevance threshold 734 can be represented in an alphanumeric combination of A to Z, 0 to 9, or a combination thereof. For a specific example, "node proximity –100 miles" can represent the node relevance threshold 734 of 100 miles for determining to depict the node 258.

Figure 7:
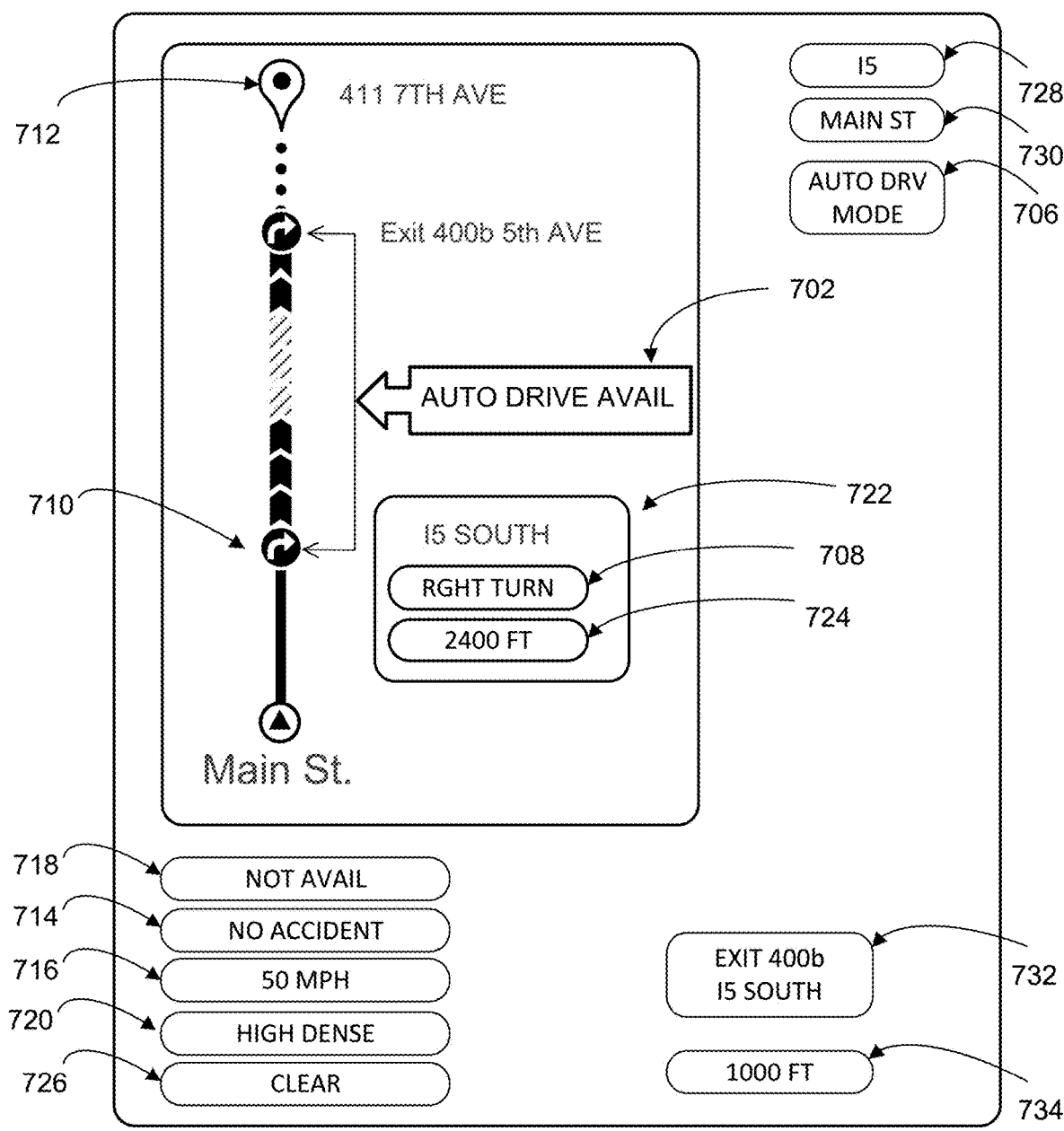
FIG. 7 is an example of the travel path including the path attribute indicator for autonomous driving session in an embodiment.

Referring now to FIG. 7, therein is shown an example of the travel path 214 of FIG. 2 including the path attribute indicator 320 of FIG. 3 for an autonomous driving session 702 in the embodiment. In this example, the embodiment is depicted with the navigation mode 502 of FIG. 5 as the operation mode 402 of FIG. 4.

Furthermore, in this example, the embodiment depicts the travel path 214 with the current street name indicator 306 of FIG. 3 as "Main St." The travel path 214 is also depicted with the current vehicle position indicator 308 of FIG. 3. In addition, there are two instances of the node 258 of FIG. 3 for the cross-street maneuver indicator 316 of FIG. 3. In this example, one instance of the cross-street maneuver indicator 316 is for an on-ramp to the right and is shown with the street name indicator 318 of FIG. 3 presenting "IS South," which represents a freeway. Another of the cross-street maneuver indicator 316 is for an off-ramp to the right and is labeled with the street name indicator 318 presenting "Exit 400b 5$^{th}$ AVE." The travel path 214 is further depicted with the destination indicator 324 of FIG. 3 labeled "411 7$^{th}$ AVE." The ellipses indicator 322 of FIG. 3 is also depicted in this embodiment of the travel path 214 between the destination point 366 of FIG. 3 and the node 258 for the cross-street maneuver indicator 316 for the "Exit 400b 5$^{th}$ AVE."

The route indicator 314 of FIG. 3 between the current vehicle position indicator 308 and the first instance of the node 258 does not show the path attribute indicator 320 for the autonomous driving session 702. In this example, the lack of the path attribute indicator 320 for the autonomous driving session 702 represents the absence of the availability for the vehicle 204 to be operated autonomously for the section of the travel path 214. The autonomous driving session 702 is defined as the control of the operation of the vehicle 204 of FIG. 2 by electronic or machine mechanism.

The next instance of the path attribute 328 along the travel path 214 between the two instances of the node 258 can be depicted with the path attribute indicator 320 for the autonomous driving session 702. The autonomous driving session 702 for the path attribute indicator 320 can show the availability for the vehicle 204 to operate autonomously for the portion of the travel path 214. As a specific example, if enabled, the vehicle 204 with the first device 102 can be operated autonomously while the vehicle 204 traverses that portion of the travel path 214. The path attribute indicator 320 for the autonomous driving session 702 is graphically depicted in a unique way to indicate the availability for the vehicle 204 to be operated autonomously compared to the depiction of the traffic condition 602 of FIG. 6. In this example, the portion of the travel path 214 where the autonomous driving session 702 is available can be depicted as a series of chevron symbol.

For illustrative purposes, the path attribute indicator 320 is shown and described as providing a single value or information with a single type of graphical representation, although it is understood that the travel path 214 can be implemented differently. For example, the route indicator 314 can show different instances of the path attribute indicator 320. As a specific example, parallel, overlapping, or combined graphical representation can be shown to represent multiple types of the information for the path attribute indicator 320 for any particular instance of the route indicator 314. The path attribute indicator 320 for heavy traffic can be shown alongside and concurrently with the path attribute indicator 320 for the autonomous driving session 702. Also as a specific example, a different but singular graphical representation for the path attribute indicator 320 can represent multiple types of the information. If the autonomous driving session 702 is represented as a series of black chevron and the heavy traffic is represented by the patterned line, then the autonomous driving session 702 in the area of the heavy traffic can be represented by a series of patterned chevron combining the chevron symbol and the patterned line.

The route bar 256 of FIG. 2 described as the travel path 214 shows a variety of types of the information that the operator 246 needs while operating or monitoring the vehicle 204 and automatically adapts to the operation mode 402 in which the vehicle 204 is currently operating in, such as driving freely in the free drive mode 404 of FIG. 4, driving with the active navigation session 406, or driving in an autonomous driving mode 706.

It has been discovered that the navigation system 100 improves safety of driving the vehicle 204 with the route bar 256 termed as the travel path 214 including several instances of the node 258 stacked vertically in a linear manner starting with the indicator 304 for the current vehicle position 310 of FIG. 3 at the bottom, the cross-street 364 of FIG. 3 or a turn maneuver 708 above the current vehicle position 310, and a destination indicator 324 at the very top with an optional instances of the ellipses indicator 322 when there are more instances of the node 258 for the cross-street 364 or a maneuver node 710 between the current vehicle position indicator 308 and the destination node 712.

The destination node 712 is defined as the location along the navigation route 228 of FIG. 2 intended as the place for the vehicle 204 to traverse to. For example, the destination node 712 can be the node 258 for the destination point 366. The node 258 are labeled with information such as name, road shield icon, the turn maneuver 708 and other types of information relevant to operator 246. The turn maneuver 708 is defined as the act of changing course. The maneuver node 710 can represent the location along the navigation route 228 for the vehicle 204 to turn maneuver 708 for traversing the navigation route 228.

The node 258 connected to the next instance of the node 258 are connected by a line that represents the road 254. The line can be visually varied to indicate conditions of the road 254, the path condition (326), or a combination thereof, such as a traffic event 714, a traffic speed 716, an autonomous-driving availability status 718, or a combination thereof. The route indicator 314 of FIG. 3 can represent the road 254 in the physical world.

The traffic event 714 is defined as the incident along the path 218. The traffic speed 716 is defined as the rate of movement of the vehicle 204 or multiple instances of the vehicle 204 along the path 218. The autonomous-driving availability status 718 is defined as the state of availability for the vehicle 204 to be operated autonomously.

The distance between multiple instance of the node 258 represent a relative distance between multiple instances of the node 258 and the presentation scale 360 can automatically be changed depending on the speed of the vehicle 204, a road network density 720, the distance to the next instance of the maneuver node 710, the path condition 326 or generally any reason the operator may want more or less detail of the road 254 ahead of him/her. The road network density 720 is defined as the state or quality of the closeness between multiple instances of the road 254. The road network density 720 can be represented in a numerical quantity or quality. For example, the road network density 720 can describe the actual number of the road 254 connected to each other in a predetermined area. In a different example, the road network density 720 can be described qualitatively such as high, medium, or low. For a specific example, the road network density 720 of "HIGH" can represent more numbers of the road 254 connected in the area as opposed to "LOW" where fewer numbers of the road 254 are connected to other instances of the road 254.

It has been discovered that the navigation system 100 improves safety of operating the vehicle 204. The navigation system 100 can provide a design for a simplified graphic display of the path condition 326 of FIG. 3 ahead of the operator 246 on the windshield 208 of the operator 246 as the head up display 220. By simplifying the graphic display of the path condition 326, the operator 246 can apprehend the information for navigation faster and more accurately while minimally being distracted from operating the vehicle 204.

As the vehicle 204 progresses along the road 254, the route bar 256 smoothly animates to reflect its progress so that the route bar 256 reflects a current surrounding 726 and an upcoming road 728 and the traffic condition 602 as accurately as possible. The current surrounding 726 is defined as an environing objects, circumstances, and conditions around the current vehicle position 310 in the real world. The upcoming road 728 is defined as the instance of the cross-street 364 ahead of the vehicle 204. For example, the upcoming road 728 can represent the cross-street 364 on the path 218 ahead of the vehicle 204, the navigation route 228, or a combination thereof.

Navigation systems have a lot of information to convey to the driver. This includes, but is not limited to, the name of a current street 730 the vehicle 204 is on, upcoming instance of the road 254, the traffic condition 602 along the navigation route 228, upcoming instance of the turn maneuver 708, and a route section 732 that can be driven autonomously by the vehicle 204. The route section 732 is defined as the portion of the navigation route 228. The current street 730 is defined as the street the vehicle 204 is currently driving on. Presenting this information to the user is a challenge for navigation system 100 because National Highway Traffic Safety Administration (NHTSA) guidelines "recommend that devices be designed so that tasks can be completed by the driver while driving with glances away from the roadway of 2 seconds or less, and a cumulative time spent glancing away from the roadway of 12 seconds or less."

Systems that fail these guidelines put their operator 246 at risk of being distracted from the path condition 326 and getting into an accident.

Figure 8:
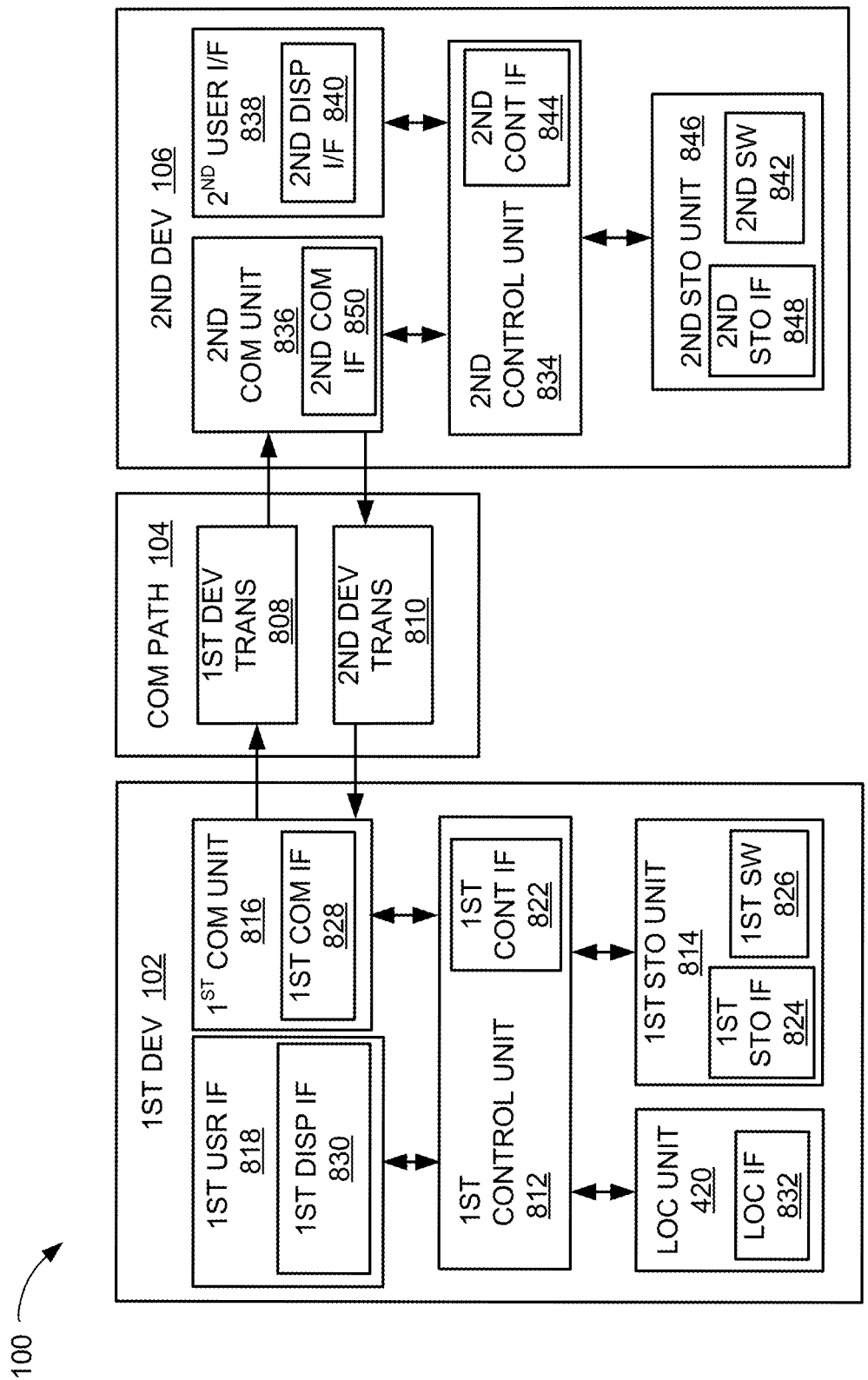
FIG. 8 is an exemplary block diagram of the navigation system.

Referring now to FIG. 8, therein is shown an exemplary block diagram of the navigation system 100. The navigation system 100 can include the first device 102, the network 104, and the second device 106. The first device 102 can send information in a first device transmission 808 over the network 104 to the second device 106. The second device 106 can send information in a second device transmission 810 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of FIG. 2 of the present invention, the first device 102 will be described as a client device and the second device 106 will be described as a server device. The embodiment of the present invention is not limited to this selection for the type of devices. The selection is an example of the embodiment of the present invention.

The first device 102 can include a first control unit 812, a first storage unit 814, a first communication unit 816, and a first user interface 818, and a location unit 820. The first control unit 812 can include a first control interface 822. The first control unit 812 can execute a first software 826 to provide the intelligence of the navigation system 100.

The first control unit 812 can be implemented in a number of different manners. For example, the first control unit 812 can be a processor, an application specific integrated circuit (ASIC) an embedded processor, a microprocessor, a hardware control logic, a hardware finite state machine (FSM), a digital signal processor (DSP), or a combination thereof. The first control interface 822 can be used for communication between the first control unit 812 and other functional units in the first device 102. The first control interface 822 can also be used for communication that is external to the first device 102.

The first control interface 822 can receive information from the other functional units or from external sources, or can transmit information to the other functional units or to external destinations. The external sources and the external destinations refer to sources and destinations external to the first device 102.

The first control interface 822 can be implemented in different ways and can include different implementations depending on which functional units or external units are being interfaced with the first control interface 822. For example, the first control interface 822 can be implemented with a pressure sensor, an inertial sensor, a microelectromechanical system (MEMS), optical circuitry, waveguides, wireless circuitry, wireline circuitry, or a combination thereof.

The first storage unit 814 can store the first software 826. The first storage unit 814 can also store the relevant information, such as data representing incoming images, data representing previously presented image, sound files, or a combination thereof.

The first storage unit 814 can be a volatile memory, a nonvolatile memory, an internal memory, an external memory, or a combination thereof. For example, the first storage unit 814 can be a nonvolatile storage such as non-volatile random access memory (NVRAM), Flash memory, disk storage, or a volatile storage such as static random access memory (SRAM).

The first storage unit 814 can include a first storage interface 824. The first storage interface 824 can be used for communication between the first storage unit 814 and other functional units in the first device 102. The first storage interface 824 can also be used for communication that is external to the first device 102.

The first storage interface 824 can receive information from the other functional units or from external sources, or can transmit information to the other functional units or to external destinations. The external sources and the external destinations refer to sources and destinations external to the first device 102.

The first storage interface 824 can include different implementations depending on which functional units or external units are being interfaced with the first storage unit 814. The first storage interface 824 can be implemented with technologies and techniques similar to the implementation of the first control interface 822.

The first communication unit 816 can enable external communication to and from the first device 102. For example, the first communication unit 816 can permit the first device 102 to communicate with the second device 106, an attachment, such as a peripheral device or a desktop computer, and the network 104.

The first communication unit 816 can also function as a communication hub allowing the first device 102 to function as part of the network 104 and not limited to be an end point or terminal unit to the network 104. The first communication unit 816 can include active and passive components, such as microelectronics or an antenna, for interaction with the network 104.

The first communication unit 816 can include a first communication interface 828. The first communication interface 828 can be used for communication between the first communication unit 816 and other functional units in the first device 102. The first communication interface 828 can receive information from the other functional units or can transmit information to the other functional units.

The first communication interface 828 can include different implementations depending on which functional units are being interfaced with the first communication unit 816. The first communication interface 828 can be implemented with technologies and techniques similar to the implementation of the first control interface 822.

The first user interface 818 allows a user (not shown) to interface and interact with the first device 102. The first user interface 818 can include an input device and an output device. Examples of the input device of the first user interface 818 can include a keypad, a touchpad, soft-keys, a keyboard, a microphone, a camera, an infrared sensor for receiving remote signals, or any combination thereof to provide data and communication inputs.

The first user interface 818 can include a first display interface 830. The first display interface 830 can include an output device. The first display interface 830 can include a display, a projector, a video screen, a speaker, or any combination thereof.

The first control unit 812 can operate the first user interface 818 to display information generated by the navigation system 100. The first control unit 812 can also execute the first software 826 for the other functions of the navigation system 100, including receiving location information from the location unit 820. The first control unit 812 can further execute the first software 826 for interaction with the network 104 via the first communication unit 816.

The location unit 820 can generate location information, current heading, current acceleration, and current speed of the first device 102, as examples. The location unit 820 can be implemented in many ways. For example, the location unit 820 can function as at least a part of the global positioning system, an inertial navigation system, a cellular-tower location system, a pressure location system, or any combination thereof. Also, for example, the location unit 820 can utilize components such as an accelerometer or GPS receiver.

The location unit 820 can include a location interface 832. The location interface 832 can be used for communication between the location unit 820 and other functional units in the first device 102. The location interface 832 can also be used for communication external to the first device 102.

The location interface 832 can receive information from the other functional units or from external sources, or can transmit information to the other functional units or to external destinations. The external sources and the external destinations refer to sources and destinations external to the first device 102.

The location interface 832 can include different implementations depending on which functional units or external units are being interfaced with the location unit 820. The location interface 832 can be implemented with technologies and techniques similar to the implementation of the first control unit 812.

The second device 106 can be optimized for implementing an embodiment of the present invention in a multiple device embodiment with the first device 102. The second device 106 can provide the additional or higher performance processing power compared to the first device 102. The second device 106 can include a second control unit 834, a second communication unit 836, a second user interface 838, and a second storage unit 846.

The second user interface 838 allows a user (not shown) to interface and interact with the second device 106. The second user interface 838 can include an input device and an output device. Examples of the input device of the second user interface 838 can include a keypad, a touchpad, softkeys, a keyboard, a microphone, a camera, or any combination thereof to provide data and communication inputs. Examples of the output device of the second user interface 838 can include a second display interface 840. The second display interface 840 can include a display, a projector, a video screen, a speaker, or any combination thereof.

The second control unit 834 can execute a second software 842 to provide the intelligence of the second device 106 of the navigation system 100. The second software 842 can operate in conjunction with the first software 826. The second control unit 834 can provide additional performance compared to the first control unit 812.

The second control unit 834 can operate the second user interface 838 to display information. The second control unit 834 can also execute the second software 842 for the other functions of the navigation system 100, including operating the second communication unit 836 to communicate with the first device 102 over the network 104.

The second control unit 834 can be implemented in a number of different manners. For example, the second control unit 834 can be a processor, an embedded processor, a microprocessor, hardware control logic, a hardware finite state machine (FSM), a digital signal processor (DSP), or a combination thereof.

The second control unit 834 can include a second control interface 844. The second control interface 844 can be used for communication between the second control unit 834 and other functional units in the second device 106. The second control interface 844 can also be used for communication that is external to the second device 106.

The second control interface 844 can receive information from the other functional units or from external sources, or can transmit information to the other functional units or to external destinations. The external sources and the external destinations refer to sources and destinations external to the second device 106.

The second control interface 844 can be implemented in different ways and can include different implementations depending on which functional units or external units are being interfaced with the second control interface 844. For example, the second control interface 844 can be implemented with a pressure sensor, an inertial sensor, a microelectromechanical system (MEMS), optical circuitry, waveguides, wireless circuitry, wireline circuitry, or a combination thereof.

A second storage unit 846 can store the second software 842. The second storage unit 846 can also store the information such as data representing incoming images, data representing previously presented image, sound files, or a combination thereof. The second storage unit 846 can be sized to provide the additional storage capacity to supplement the first storage unit 814.

For illustrative purposes, the second storage unit 846 is shown as a single element, although it is understood that the second storage unit 846 can be a distribution of storage elements. Also for illustrative purposes, the navigation system 100 is shown with the second storage unit 846 as a single hierarchy storage system, although it is understood that the navigation system 100 can have the second storage unit 846 in a different configuration. For example, the second storage unit 846 can be formed with different storage technologies forming a memory hierarchal system including different levels of caching, main memory, rotating media, or off-line storage.

The second storage unit 846 can be a volatile memory, a nonvolatile memory, an internal memory, an external memory, or a combination thereof. For example, the second storage unit 846 can be a nonvolatile storage such as non-volatile random access memory (NVRAM), Flash memory, disk storage, or a volatile storage such as static random access memory (SRAM).

The second storage unit 846 can include a second storage interface 848. The second storage interface 848 can be used for communication between the second storage unit 846 and other functional units in the second device 106. The second storage interface 848 can also be used for communication that is external to the second device 106.

The second storage interface 848 can receive information from the other functional units or from external sources, or can transmit information to the other functional units or to external destinations. The external sources and the external destinations refer to sources and destinations external to the second device 106.

The second storage interface 848 can include different implementations depending on which functional units or external units are being interfaced with the second storage unit 846. The second storage interface 848 can be implemented with technologies and techniques similar to the implementation of the second control interface 844.

The second communication unit 836 can enable external communication to and from the second device 106. For example, the second communication unit 836 can permit the second device 106 to communicate with the first device 102 over the network 104.

The second communication unit 836 can also function as a communication hub allowing the second device 106 to function as part of the network 104 and not limited to be an end point or terminal unit to the network 104. The second communication unit 836 can include active and passive components, such as microelectronics or an antenna, for interaction with the network 104.

The second communication unit 836 can include a second communication interface 850. The second communication interface 850 can be used for communication between the second communication unit 836 and other functional units in the second device 106. The second communication interface 850 can receive information from the other functional units or can transmit information to the other functional units.

The second communication interface 850 can include different implementations depending on which functional units are being interfaced with the second communication unit 836. The second communication interface 850 can be implemented with technologies and techniques similar to the implementation of the second control interface 844.

The first communication unit 816 can couple with the network 104 to send information to the second device 106 in the first device transmission 808. The second device 106 can receive information in the second communication unit 836 from the first device transmission 808 of the network 104.

The second communication unit 836 can couple with the network 104 to send information to the first device 102 in the second device transmission 810. The first device 102 can receive information in the first communication unit 816 from the second device transmission 810 of the network 104. The navigation system 100 can be executed by the first control unit 812, the second control unit 834, or a combination thereof. For illustrative purposes, the second device 106 is shown with the partition having the second user interface 838, the second storage unit 846, the second control unit 834, and the second communication unit 836, although it is understood that the second device 106 can have a different partition. For example, the second software 842 can be partitioned differently such that some or all of its function can be in the second control unit 834 and the second communication unit 836. Also, the second device 106 can include other functional units not shown in FIG. 8 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 9:
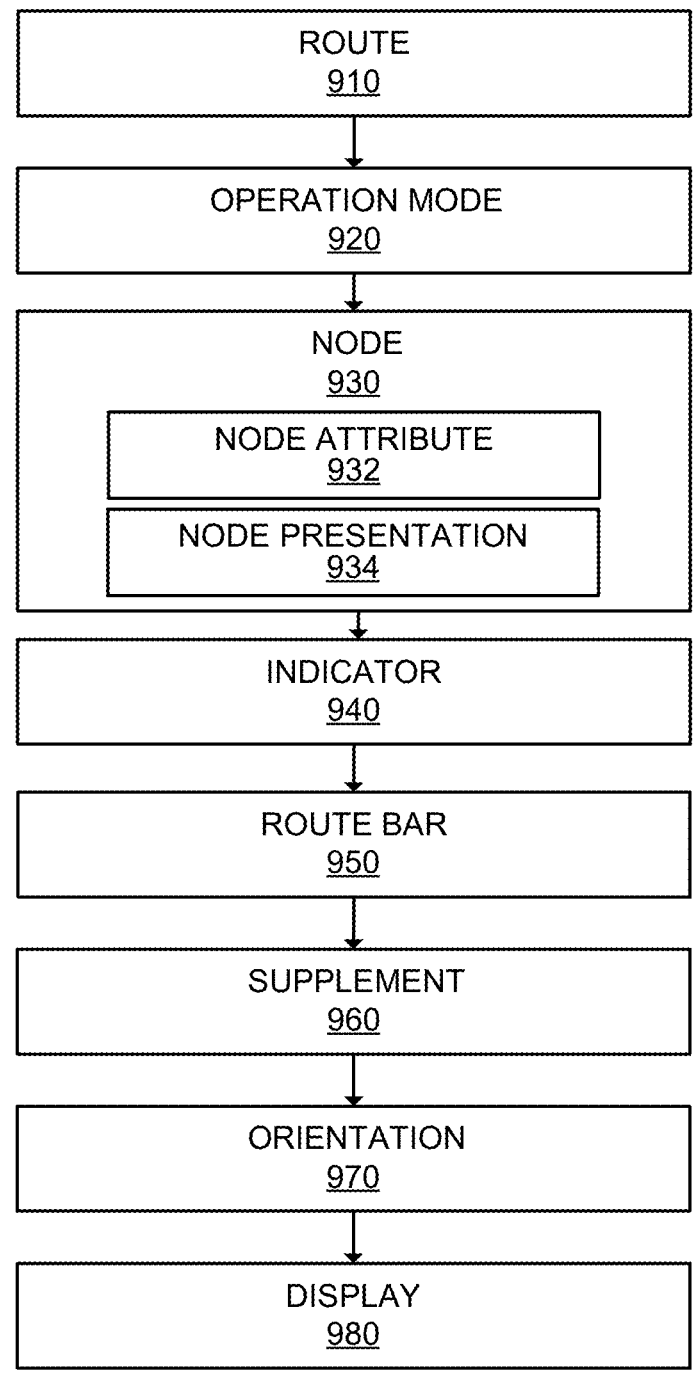
FIG. 9 is a control flow of the navigation system.

Referring now to FIG. 9, therein is shown a control flow of the navigation system 100. The navigation system 100 can include a route module 910. The route module 910 generates the navigation route 228 of FIG. 2.

The route module 910 can generate the navigation route 228 in various ways. For example, the route module 910 can generate the navigation route 228 based on the current vehicle position 310 of FIG. 3 and the destination point 366 of FIG. 3. In this example, the route module 910 can determine the current vehicle position 310 with a GPS signal, retrieving the physical location 242 of FIG. 2 of the vehicle 204 of FIG. 2, tracking the movement of the vehicle 204 from the previously known instance of the current vehicle position 310 with a motion inertial measurement, or a combination thereof.

In a different example, the route module 910 can receive the destination point 366 from the operator 246 through the first user interface 818. In another example, the route module 910 can retrieve the destination point 366 from the first storage unit 814, from the second storage unit 846 through the first communication unit 816, or a combination thereof.

Continuing in this example, the route module 910 can generate the navigation route 228 based on the path 218 of FIG. 2 between the current vehicle position 310 of the vehicle 352 and the destination. For a specific example, the route module 910 can generate the navigation route 228 based on the current vehicle position 310 shown as the vehicle 204 of FIG. 3 and the destination point 366 at "E" of FIG. 3.

The navigation system 100 can include an operation mode module 920, which can couple to the route module 910. The operation mode module 920 determines the operation mode 402 of FIG. 4 of the navigation system 100.

The operation mode module 920 can determine the navigation mode 502 of FIG. 5 as the operation mode 402 in various ways. For example, the operation mode module 920 can determine the navigation mode 502 as the operation mode 402 based on the destination point 366, the navigation route 228, or a combination thereof. For a specific example, the operation mode module 920 can determine the navigation mode 502 as the operation mode 402 based on retrieving the destination point 366 from the route module 910. In another specific example, the operation mode module 920 can determine the navigation mode 502 as the operation mode 402 based on retrieving the navigation route 228 from the route module 910.

In a different example, the operation mode module 920 can determine the free drive mode 404 of FIG. 4 as the operation mode 402. For example, the operation mode module 920 can determine the free drive mode 404 for the operation mode 402 based on not retrieving the destination point 366, the navigation route 228, or a combination thereof from the route module 910. In other words, the operation mode module 920 can determine the free drive mode 404 as the default setting of the operation mode 402 unless the destination point 366, the navigation route 228, or a combination thereof can be provided to the operation mode module 920.

In a further example, the operation mode module 920 can determine the autonomous driving mode 706 as the operation mode 402 based on the user preference and the autonomous-driving availability status 718 of FIG. 7. For a specific example, the operation mode module 920 can determine the autonomous-driving availability status 718 based on comparing the current vehicle position 310, the navigation route 228, or a combination thereof and the map 252 of FIG. 2 including the path 218 for the autonomous driving session 702 of FIG. 7. Based on the match, the operation mode module 920 can determine the autonomous-driving availability status 718 as "available." Continuing in this specific example, based on the autonomous-driving availability status 718 of "available," the user preference to operate the vehicle 204 autonomously, and detecting no impediment in the current surrounding 726 of FIG. 7, the operation mode module 920 can determine the autonomous driving mode 706 as the operation mode 402.

The operation mode module 920 can detect impediment in the current surrounding 726 in various ways. For example, the operation mode module 920 can scan the current surrounding 726 using a laser scanner, a video scanner, an infrared scanner, a radar, or a sonar to detect the impediments. The operation mode module 920 can also determine the impediment in the current surrounding 726 based on comparing the physical location 242 of the path 218 ahead of the vehicle 204, the navigation route 228, or a combination thereof with the map 252 including the physical location 242 of the impediments stored in the first storage unit 814, the second storage unit 846 through the first communication unit 816, or a combination thereof for a match. Based on the match, the operation mode module 920 can determine the presence of the impediment in the current surrounding 726.

The operation mode module 920 can determine the autonomous-driving availability status 718 as "available" based on the presence of the impediment if the impediment does not obstruct the line of travel of the vehicle 204. For example, the operation mode module 920 can generate a line of travel based on the predicted movement of the vehicle 204.

Continuing in this example, the operation mode module 920 can compare the physical location 242 of the impediment and the line of travel by the vehicle 204 for a match. If the match is not determined, the operation mode module 920 can determine the autonomous driving availability status 718 as "available." Based on determining the match, the operation mode module 920 can determine the autonomous driving availability status 718 as "unavailable."

In these examples, the operation mode module 920 can determine the autonomous driving mode 706 as the operation mode 402 concurrently with either the free drive mode 404 or the navigation mode 502. For example, the vehicle 204 operating with the navigation mode 502 and the autonomous driving mode 706 as the operation mode 402 can traverse autonomously through the navigation route 228 to reach the destination point 366. In a different example, the vehicle 204 operating in the free drive mode 404 and the autonomous driving mode 706 can traverse the road 254 autonomously straight along the current street 730. In another example, the operation mode module 920 can determine the operation mode 402 based on retrieving the operation mode 402 representing the navigation mode 502, the free drive mode 404, the autonomous driving mode 706, or a combination thereof from the first storage unit 814, the second storage unit 844 through the first communication unit 816, the operator 246 through the first user interface 818, or a combination thereof.

The navigation system 100 can include a node module 930, which can couple to the operation mode module 920. The node module 930 determines the node 258 of FIG. 2 of the navigation system 100.

The node module 930 can determine the node 258 based on the navigation route 228, the path 218 ahead of the vehicle 204, the operation mode 402, the map 252, or a combination thereof. For example, the node module 930 can determine the node 258 at the physical location 242 where another instance of the road 254 connects to the navigation route 228, the path 218 ahead of the vehicle 204 on the map 252, or a combination thereof for the vehicle 204 in the free drive mode 404.

For example, the street name 302 of the road 254 currently traversed by the vehicle 204 can be "Main St." of FIG. 4. In this example, the node module 930 can trace the path 218 ahead of the vehicle 204 along the map 252 to determine the road 254 connecting to the path 218. For a specific example, the node module 930 can determine the "4$^{th}$ Ave.," the "5$^{th}$ Ave.," and the "6$^{th}$ Ave." as the road 254 connecting to the path 218 ahead of the vehicle 204. In this example, the node module 930 can determine the physical location 242 where the road 254 connect to the path 218 ahead of the vehicle 204 as the node 258.

For a different example, the node module 930 can trace the navigation route 228 from the current vehicle position 310 to the destination point 366 along the navigation route 228 for the vehicle 204 operating in the navigation mode 502 to determine the node 258. In this example, the node module 930 can determine the node 258 at the physical location 242 of the turn maneuver 708 along the navigation route 228 based on the street name 302 changing from one to another. More specifically, the node module 930 can determine the instance of the node 258 as the maneuver node 710.

For a specific example, the node module 930 can trace the navigation route 228 between the current vehicle position 310 of FIG. 5 and the destination point 366 of FIG. 5. In this specific example, the node module 930 can determine the physical location 242 for the turn maneuver 708 at the "4TH AVE." of FIG. 5, the "BROADWAY ST." of FIG. 5, and the "12TH AVE." of FIG. 5 as the node 258 representing the maneuver node 710 based on the street name 302 changing from one to another.

In a different example, the node module 930 can include a node attribute module 932. The node attribute module 932 determines the node attribute 722 of FIG. 7 of the node 258. The node attribute 722 is defined as a feature of the node 258. For example, the node module 930 can determine the node attribute 722 of the node 258 including the cross-street 364 of FIG. 3, the traffic sign 216, the turn maneuver 708, a multiple lane information, a traffic monitor, or a combination thereof at the physical location 242 of the node 258.

For example, the node attribute module 932 can scan the map 252 along the navigation route 228 for the road 254 intersecting the path 218 ahead of the vehicle 204, the navigation route 228, or a combination thereof. In this example, the node attribute module 932 can determine the road 254 intersecting the node 258 as the node attribute 722 representing the cross-street 364.

For a specific example, the node attribute module 932 can scan the path 218 ahead of the vehicle 204 of FIG. 5. In this specific example, for the node 258 nearest to the current vehicle position 310, the node attribute module 932 can determine the street named "4TH AVE" intersecting the navigation route 228 at the node 258 to determine "4TH AVE" as the node attribute 722 representing the cross-street 364. In a different specific example, for the node 258 second nearest to the current vehicle position 310, the node attribute module 932 can determine the street named "5TH AVE" intersecting the navigation route 228 at the node 258 to determine "5TH AVE" as the node attribute 722 representing the cross-street 364. In a further specific example, for the node 258 third nearest to the current vehicle position 310, the node attribute module 932 can determine the street named "6TH AVE" intersecting the navigation route 228 at the node 258 to determine "6TH AVE" as the node attribute 722 representing the cross-street 364.

In a different specific example, the node attribute module 932 can scan the map 252 for the traffic sign 216 located at the node 258 of the navigation route 228. In this specific example, the node attribute module 932 can determine the traffic sign 216 located at the node 258 as the node attribute 722 representing the traffic sign 216.

In another specific example, the node attribute module 932 can trace the navigation route 228 through the node 258 representing the maneuver node 710. In this specific example, the node attribute module 932 can determine the turn maneuver 708 for the node 258 at "4TH AVE" of FIG. 3 as the node attribute 722 based on determining the navigation route 228 turning from one instance of the road 254 to another instance of the road 254.

In another specific example, the node attribute module 932 can scan the map 252 for the lane information located at the physical location 242 of the node 258. In this specific example, the node attribute module 932 can determine the lane information located at the physical location 242 of the node 258 as the node attribute 722 representing the lane information.

In a different specific example, the node attribute module 932 can scan the map 252 for the traffic monitor located at the physical location 242 of the node 258 along the navigation route 228. In this specific example, the node attribute module 932 can determine the node attribute 722 representing the traffic monitor based on determining the traffic monitor located at the physical location 242 of the node 258 of the navigation route 228.

For a different example, the node attribute module 932 can determine the node attribute 722 representing a node proximity 724. The node proximity 724 is defined as the distance between the current vehicle position 310 and the physical location 242 of the node 258. For example, the node attribute module 932 can measure the distance between the current vehicle position 310 and the node 258 along the navigation route 228 on the map 252 to determine the node proximity 724.

For a specific example, the node attribute module 932 can measure the distance between the current vehicle position 310 of FIG. 6 and the first instance of the node 258 denoted "4TH AVE" of FIG. 6. In this specific example, the node attribute module 932 can determine "1000 feet (FT)" as the node proximity 724 based on the distance of 1000 FT between the current vehicle position 310 and the node 258. In a different specific example, the node attribute module 932 can measure the distance between the current vehicle position 310 and the node 258 denoted "5TH AVE." of FIG. 6. In this specific example, the node attribute module 932 can determine "2000 FT" as the node proximity 724 based on the distance of 2000 FT between the current vehicle position 310 and the node 258 at "5TH AVE."

In another example, the node attribute module 932 can retrieve the node attribute 722 representing the node relevance threshold 734. For example, the node attribute module 932 can retrieve the node relevance threshold 734 from the first storage unit 814, from the second storage unit 846 through the first communication unit 816, from the operator 246 of the vehicle 204 through the first user interface 818, or a combination thereof.

For a specific example, the node attribute module 932 can retrieve the node relevance threshold 734 of "NODE PROXIMITY—50 MILES." In a different specific example, the node attribute module 932 can retrieve the node relevance threshold 734 of "RIGHT/LEFT TURN ONLY."

The node attribute module 932 is not limited to retrieving the specific examples of the node relevance threshold 734 discussed above. For example, the node attribute module 932 can retrieve the node relevance threshold 734 of the various values and other permutations of the examples discussed above as well.

The node module 930 can also include a node presentation module 934. The node presentation module 934 determines the node presentation 606 of FIG. 6. The node presentation module 934 can determine the node presentation 606 of the node 258 in various ways.

For example, the node presentation module 934 can determine the node presentation 606 based on the free drive mode 404 as the navigation mode 502. In this example, the node presentation module 934 can determine the node presentation 606 of the node 258 as "display" based on the node attribute 722 meeting or exceeding the node relevance threshold 734 of FIG. 7. In a different example, the node presentation module 934 can determine the node presentation 606 of the node 258 as "not-display" based on the node relevance threshold 734 exceeding the node attribute 722.

For a specific example, the node relevance threshold 734 can be "10 kilometers per hour (KPH)" and the node attribute 722 representing the traffic speed 716 can be "100 KPH." In this example, the node presentation module 934 can determine the node presentation 606 of the node 258 as "display" based on the traffic speed 716 meeting the requirement of the node relevance threshold 734.

For an alternative example, the node presentation module 934 can be configured to determine the node presentation 606 to meet or exceed the node relevance threshold 734 based on the node attribute 722 being lower than the node relevance threshold 734. For a specific example, the node relevance threshold 734 can be "60 MILES" and the node attribute 722 representing the node proximity 724 can be "50 MILES." In this example, the node presentation module 934 can determine the node presentation 606 of the node 258 as "not display" based on the node proximity 724 not meeting the node relevance threshold 734.

In a different example, the node presentation module 934 can determine the node presentation 606 based on the navigation mode 502 as the operation mode 402. In this example, the node presentation module 934 can determine the node presentation 606 of the maneuver node 710 as "display" based on the node attribute 722 meeting or exceeding the node relevance threshold 734, the node relevance threshold 734 meeting or exceeding the node proximity 724 of the maneuver node 710, or a combination thereof.

For a specific example, the node presentation module 934 can determine the node attribute 722 representing the turn maneuver 708 for the right turn. Continuing in this specific example, the node relevance threshold 734 can be the right turn, left turn, or U-turn. Further, the node proximity 724 can be 0.5 kilometers (KM), the node relevance threshold 734 can be 3 KM, or a combination thereof. In this specific example, the node presentation module 934 can determine the node presentation 606 of "display" for the maneuver node 810 based on the turn maneuver 708 meeting the node relevance threshold 734 of right turn and the node relevance threshold 734 of 3 KM exceeding the node proximity 724 of 0.5 KM.

In a different specific example, the node presentation module 934 can determine "not-display" as the node presentation 606 of the maneuver node 710 based on the node attribute 722 of the turn maneuver node 710 not meeting the node relevance threshold 734, the node proximity 724 meeting or exceeding the node relevance threshold 734, or a combination thereof.

For a specific example, the node attribute 722 of the maneuver node 710 can be the turn maneuver 708 representing straight, the node relevance threshold 734 can be the right turn, left turn, or U-turn. Continuing in this specific example, the node proximity 724 can be 5 kilometers (KM) and the node relevance threshold 734 can be 3 KM. In this specific example, the node presentation module 934 can determine the node presentation 606 of "not-display" for the maneuver node 810 based on the node attribute 722 of straight not meeting the node relevance threshold 734 of right turn, left turn, or U-turn. Continuing in this specific example, the node presentation module 934 can determine the node presentation 606 of "not-display" for the maneuver node 810 based on the node proximity 724 of 5 KM exceeding the node relevance threshold 734 of 3 KM.

Furthermore, the node presentation module 934 can determine the node presentation 606 of the maneuver node 710 for displaying a graphic symbol for the turn maneuver 708. For a specific example, the node presentation module 934 can determine the graphics symbol for a "right turn" of FIG. 5, a "left turn" of FIG. 5, the U-turn, or a combination thereof based on the node attribute 722 of the maneuver node 710 representing the right turn, the left turn, or U-turn and the node presentation 606 of "display."

The navigation system 100 can include an indicator module 940, which can couple to the node module 930. The indicator module 940 generates the indicator 304 of the navigation system 100.

For example, the indicator module 940 can generate the current street name indicator 306 of FIG. 3 based on the current vehicle position 310 and the street name 302. In this example, the indicator module 940 can compare the current vehicle position 310 and the road 254 the vehicle is currently positioned on the map 252. The indicator module 940 can generate the street name indicator 318 of FIG. 3 based on the street name 302 of the road 254 on the map 252 matching the physical location 242 of the current vehicle position 310.

In a different example, the indicator module 940 can generate the current vehicle position indicator 308 of FIG. 3 based on the current vehicle position 310, the map 252, or a combination thereof. For example, the indicator module 940 can generate the current vehicle position indicator 308 for the location on the windshield 208 representing the current vehicle position 310.

In a further example, the indicator module 940 can generate the route indicator 314 based on the navigation route 228 and the node 258. For example, the indicator module 940 can generate the route indicator 314 for the path 218 connecting an instance of the node 258 to another instance of the node 258 along the navigation route 228. For a specific example, the indicator module 940 can generate the route indicator 314 connecting the path 218 from the current vehicle position 310 of FIG. 5 to the third instance of the node 258 for the 12$^{th}$ AVE. In this specific example, the indicator module 940 can generate the route indicator 314 with a line, a box, or a combination thereof of FIG. 5 to represent the road 254 along the navigation route 228 between the current vehicle position 310 and the node 258 at the 12$^{th}$ AVE.

In another example, the indicator module 940 can generate the cross-street maneuver indicator 316 of FIG. 3 based on the node attribute 722 representing the turn maneuver 708 for the maneuver node 710. For a specific example, the indicator module 940 can generate the cross-street maneuver indicator 316 with a symbol indicating the turn maneuver 708 representing right turn, left turn, U-Turn, or a combination thereof based on the node attribute 722 representing the turn maneuver 708 of right turn, left turn, U-turn, or a combination thereof for the maneuver node 710.

In a different example, the indicator module 940 can generate the street name indicator 318 based on the street name 302 of the road 254 along the navigation route 228. For example, the indicator module 940 can generate the street name indicator 318 for the road 254 along the navigation route 228 based on the alphanumeric combination of A through Z, 0 through 9, or a combination thereof. For a specific example, the indicator module 940 can generate the street name indicator 318 of "4TH AVE." of FIG. 5 based on the street name 302 of the road 254 with the street name 302 of "4TH AVE." along the navigation route 228 between the first instance of the node 258 and the second instance of the node 258 from the current vehicle position 310 of FIG. 5.

In another example, the indicator module 940 can retrieve the path attribute 328 of FIG. 3 from the first storage unit 814, the second storage unit 846 through the first communication interface 828, the operator 246 through the first user interface 818, or a combination thereof. Continuing in this example, the indicator module 940 can generate the path attribute indicator 320 of FIG. 3 based on the path attribute 328 and the corresponding instance of the path 218. For example, the indicator module 940 can generate the path attribute indicator 320 showing heavy traffic based on the path attribute 328 of "HEAVY TRAFFIC" for the path 218 between the second instance of the node 258 at the cross-street 364 of "5TH AVE" and the third instance of the node 258 of FIG. 6 at the cross-street 364 of "6TH AVE." In a different specific example, the indicator module 940 can generate the path attribute indicator 320 showing the autonomous-driving availability status 718 of "AUTODRIVE AVAILABLE" for the route section 732 between the node 258 at "IS SOUTH" and the node 258 at "EXIT 400b 5$^{th}$ Ave." of FIG. 7.

The indicator module 940 is not limited to generating the path attribute indicator 320 based on the types of the path attribute 328 of the examples described above. For example, the indicator module 940 can generate the path attribute indicator 320 based on the various other types of the path attribute 328 including the traffic speed 716 of FIG. 7, the road hazard, or a combination thereof.

In a different example, the indicator module 940 can generate the ellipses indicator 322 of FIG. 3 based on the node 258, the node presentation 606, or a combination thereof. For example, the indicator module 940 can determine the instance of the node 258 along the navigation route 228, the path 218 ahead of the vehicle 204, or a combination thereof including the node presentation 606 of "NOT DISPLAY" adjacent to each other. Continuing in this example, based on the number of the node 258 including the node presentation 606 of "NOT DISPLAY" adjacent to each other meeting or exceeding the ellipses presentation threshold 374, the indicator module 940 can generate the ellipses indicator 322. In this example, the indicator module 940 can retrieve the ellipses presentation threshold 374 from the first storage unit 814, the second storage unit 846 through the first communication unit 816, the operator 246 through the first user interface 818, or a combination thereof.

For a specific example, the indicator module 940 can retrieve the ellipses presentation threshold 374 of "6 NODES" from the first storage unit 814. In this specific example, the number of the node 258 along the navigation route 228 including the node presentation 606 of "NOT DISPLAY" adjacent to each other can be 3. Comparing the ellipses presentation threshold 374 and the number of the node 258 adjacent to each other with the node presentation 606 of "NOT DISPLAY," the indicator module 940 will not generate the ellipses indicator 322 based on the 3 instances of the node 258 adjacent to each other not meeting or exceeding the ellipses presentation threshold 374 of 6.

In a different specific example, the number of the node 258 along the navigation route 228 including the node presentation 606 of "NOT DISPLAY" adjacent to each other can be 8. In this specific example, the indicator module 940 can generate the ellipses indicator 322 for the portion of the route section 732 between the node 258 closest to the current vehicle position 310 and the node 258 furthest from the current vehicle position 310 based on the number of the node 258 with the node presentation 606 of "NOT DISPLAY" adjacent to each other of 8 exceeding the ellipses presentation threshold of 6.

In another example, the indicator module 940 can generate the destination indicator 324 of FIG. 3 based on the destination point 366. For example, the indicator module 940 can generate the destination indicator 324 based on generating the symbol representing the destination point 366. For a specific example, square symbol with "D" of FIG. 3 can represent the destination indicator 324 for the destination point 366. The navigation system 100 can include a route bar module 950, which can couple to the indicator module 940. The route bar module 950 generates the route bar 256 of FIG. 2 of the navigation system 100.

The route bar module 950 can generate the route bar 256 based on the operation mode 402, the node 258, the node attribute 722, the node presentation 606, the indicator 304, or a combination thereof. For example, the route bar module 950 can generate the route bar 256 for the navigation mode 502 as the operation mode 402. In this example, the route bar module 950 can arrange the position of the node 258, the indicator 304, or a combination thereof based on the node presentation 606, the node attribute 722, the current vehicle position 310, ellipses presentation threshold 374, or a combination thereof.

For a specific example, there can be three instances of the node 258 with the node presentation 606 representing "display" for FIG. 5. In this specific example, the first instance of the node 258 can include the node attribute 722 representing the node proximity 724 of 1000 FT, the second instance of the node 258 can include the node proximity 724 of 2000 FT, and the third instance of the node proximity 724 can include the node proximity 724 of 3000 ft. Continuing in this specific example, the first instance of the node 258 can include the node attribute 722 representing the turn maneuver 708 of "right turn," the second instance of the node 258 can include the turn maneuver 708 of left turn, and the third instance of the node 258 can include the turn maneuver 708 of "right turn."

Furthermore, in this specific example, the route bar module 950 can compare the node proximity 724 of the three instances of the node 258 and position the node 258 with a shorter distance closer to the current vehicle position 310. For example, based on the node proximity 724 included in the three instances of the node 258, the route bar module 950 can position the first instance of the node 258 with the node proximity 724 of 1000 FT above to the current vehicle position 310, the second instance of the node 258 with the node proximity 724 of 2000 FT above the first instance of the node 258, and the third instance of the node 258 above the second instance of the node 258. Continuing in this example, the route bar module 950 can position the destination point 366 above the third instance of the node 258.

The route bar module 950 can also position the cross-street maneuver indicator 316. For example, the route bar module 950 can position the cross-street maneuver indicator 316 in the relative location 352 of the turn maneuver node 710 on the route bar 256. For a specific example, the route bar module 950 can position the cross-street maneuver indicator 316 in the relative location 352 of the turn maneuver node 710 including the node attribute 722 of "right turn" of FIG. 5. In this specific example, the route bar module 950 can position the maneuver indicator 304 showing the right turning arrow of FIG. 5 for the first instance and the third instance of the node 258 based on the turn maneuver 708 of right turn. Continuing in this example, the route bar module 950 can position the cross-street maneuver indicator 316 showing the left turning arrow of FIG. 5 for the second instance of the node 258 based on the turn maneuver 708 of left turn for the node 258.

The route bar module 950 can further position the indicator 304 based on the relative location 352 of the indicator 304 in the physical world the indicator 304 is based on. For a specific example, starting from the bottom of the route bar 256 of FIG. 3, the route bar module 950 can position the current street name indicator 306 at the bottom of the route bar 256, the current vehicle position indicator 308 above the current street name indicator 306, the cross-street maneuver indicator 316 and the street name indicator 318 above the current vehicle position indicator 308, the path attribute indicator 320 above the street name indicator 318, the ellipses indicator above the path attribute indicator 320, and the destination indicator 324 above the ellipses indicator 322 based on the relative location 352 in the physical world the indicator 304 is based on.

Continuing in this example, the route bar module 950 can further position the route indicator 314 in the relative location 352 of the route bar 256 between of the node 258. For a specific example, the route bar module 950 can position the route indicator 314 between the three instances of the node 258 of FIG. 5. For example, route bar module 950 can position the first instance of the route indicator 314 between the current vehicle position 310 and the first instance of the node 258 of FIG. 5, position the second instance of the route indicator 314 between the first instance of the node 258 and the second instance of the node 258 of FIG. 5, and position the third instance of the route indicator 314 between the second instance of the node 258 and the third instance of the node 258 of FIG. 5.

Further, the route bar module 950 can position the ellipses indicator 322 based on the node 258 the ellipses indicator 322 was based on. For example, the route bar module 950 can position the ellipses indicator 322 at the relative location 352 on the route bar 256 of the node 258 the ellipses indicator 322 was based on. For example, the route bar module 950 can position the ellipses indicator 322 between the third instance of the node 258 of FIG. 5 and the destination point 366 of FIG. 5 based on the relative location 352 of the multiple instances of the node 258 the ellipses indicator 322 was based on between the node 258 for the 12TH AVE and the destination point 366 at the 411 7TH AVE.

In a different example, the route bar module 950 can generate the route bar 256 based on arranging the position of the node 258, the indicator 304, or a combination thereof based on the node presentation 606, the node attribute 722, the operation mode 402 representing the free drive mode 404 of FIG. 6, the current vehicle position 310, the ellipses presentation threshold 374, or a combination thereof. For a specific example, the first instance of the node 258 of FIG. 6 can include the node attribute 722 representing the node proximity 724 of 1000 FT, the second instance of the node 258 of FIG. 5 can include the node proximity 724 of 2000 FT, and the third instance of the node proximity 724 can include the node proximity 724 of 3000 FT.

Continuing in the specific example, the route bar module 950 can arrange the node 258 including the node presentation 606 of "DISPLAY." In this specific example, the route bar module 950 can compare the node proximity 724 for the three instances of the node 258 including the node presentation 606 of "DISPLAY" and position the node 258 with a shorter distance of the node proximity 724 closer to the current vehicle position 310 in relation to the other instances of the node 258. For example, based on the node proximity 724 included in the three instances of the node 258, the route bar module 950 can position the first instance of the node 258 above the current vehicle position 310, the second instance of the node 258 above the first instance of the with the node 258, and the third instance of the node 258 above the second instance of the node 258. Continuing in this example, the route bar module 950 can position the node 258 representing the destination point 366 above the third instance of the node 258.

Furthermore, the route bar module 950 can position the path attribute indicator 320 at the relative location 352 to the physical world. For a specific example, the route bar module 950 can position the path attribute indicator 320 representing "no traffic" between the current vehicle position 310 of FIG. 6 and the first instance of the node 258 at FIG. 6, the path attribute indicator 320 representing "moderate traffic" between the first instance of the node 258 and the second instance of the node 258 of FIG. 6. Continuing in this specific example, the route bar module 950 can position the path attribute indicator 320 representing "heavy traffic" between the second instance of the node 258 and the third instance of the node 258 of FIG. 6, or a combination thereof based on the instances of the node 258 located at the relative location in the physical world. Furthermore, the route bar module 950 can position the ellipses indicator 322 above the third instance of the node 258 based on the relative location 352 to the physical world of the node 258 in which the ellipses indicator 322 is based on.

In a different specific example, the route bar module 950 can position the path attribute indicator 320 representing the autonomous-driving availability status 718. For example, the route bar module 950 can position the path attribute indicator 320 representing the autonomous-driving availability status 718 permitting the autonomous driving session 702 on the route bar 256 of FIG. 7 at the relative location 352 to the physical world.

For a specific example, the autonomous driving session 702 can be available for the route section 732 between the first instance of the node at "IS South" and the second instance of the node 258 at "Exit 400b 5$^{th}$ AVE" of FIG. 7. In this example, the route bar module 950 can position the path attribute indicator 320 showing the autonomous-driving availability status 718 permitting the autonomous driving session 702 with a graphical symbol, for example, a chevron symbol between the two instances of the maneuver node 710 of FIG. 7.

The route bar module 950 can further determine the safe location 232 of FIG. 2 of the navigation system 100. The route bar module 950 can determine the safe location 232 in various ways.

For example, the route bar module 950 can determine the safe location 232 based on the sight direction 230, the safe peripheral vision 250, the windshield 208, or a combination thereof of. For example, the route bar module 950 can determine the portion of the windshield 208 available for displaying the route bar 256 based on retrieving the information of the portion available for displaying from the first storage unit 814, the second storage unit 846 through the first communication interface, captured from the user through the first user interface 818, or a combination thereof. Continuing in this example, the route bar module 950 can also determine the section of the windshield 208 available for displaying the route bar 256 based on scanning the surface of the windshield 208.

The route bar module 950 can further determine the safe location 232 based on the sight direction 230 of the operator 246 based on the head direction of the operator 246, the eye direction of the operator 246, or a combination thereof. For a specific example, the route bar module 950 can determine the sight direction 230 as 20 degrees to the left from the travel direction of the vehicle 204 based on the head direction of the operator 246. Continuing in this specific example, the route bar module 950 can determine the safe peripheral vision 250 as the left 66% of the windshield 208 based on the sight direction 230. The route bar module 950 can determine the left 66% of the section of the windshield 208 as the safe location 232 based on the section of the windshield 208 overlapping with the safe peripheral vision 250.

For a different example, the route bar module 950 can further consider the position of the item 212 of FIG. 2 located in the current surrounding 726 for determining the safe location 232. In this specific example, the route bar module 950 can scan the current surrounding 726 for the item 212 that can collide with the vehicle 204. For example, the route bar module 950 can remove the section of the safe location 232 on the windshield 208 that can cause visual obstruction of the item 212 of the emergency 238 or the urgent view 240.

It has been discovered that the navigation system 100 determining the safe location 232 based on the sight direction 230 of the operator 246, the safe peripheral vision 250, or a combination thereof improves the safety of the navigation system 100. For example, by determining the safe location 232 based on the sight direction 230 of the operator 246, the safe peripheral vision 250, or a combination thereof, the navigation system 100 can determine the safe location 232 for displaying the route bar 256 without diverting the attention of the operator 246 from the road 254 for an extended time period. By allowing the operator 246 to view the route bar 256 without diverting the sight direction 230 from the road 254 for an extended time period, the navigation system 100 can reduce the overall distraction for the operator 246 to operate the vehicle 204 in a safer manner.

The navigation system 100 can include a supplement module 960, which can couple to the route bar module 950. The supplement module 960 determines the supplement 210 of FIG. 2 of the navigation system 100.

The supplement module 960 can determine the supplement 210 in various ways. For example, the supplement module 960 can determine the supplement 210 based on the item 212 meeting or exceeding the supplement presentation threshold 248 of FIG. 2. Continuing in this example, the supplement module 960 can retrieve the supplement presentation threshold 248 from the first storage unit 814, the second storage unit 846 through the first communication unit 816, or a combination thereof.

For a specific example, the supplement module 960 can determine the item 212 representing a "pedestrian" trying to cross the street positioned 300 feet from the vehicle 204 based on scanning the current surrounding 726. In this specific example, the supplement module 960 can compare the "pedestrian" and the item 212 in the list included in the supplement presentation threshold 248 for a match. Continuing in this specific example, the supplement module 960 can determine the distance associated with the pedestrian in the supplement presentation threshold 248 as 200 FT. Based on the comparison, the supplement module 960 can determine the pedestrian as the supplement 210 based on the distance of 300 FT between the current vehicle position 310 and the pedestrian exceeding the distance of 200 FT of the supplement presentation threshold 248.

The supplement module 960 can further determine the supplement 210 as the emergency 238 of FIG. 2, urgent view 240 of FIG. 2, or a combination thereof. For example, the supplement module 960 can determine the supplement 210 as the emergency 238 based on the vehicle 204 requiring an avoidance maneuver to avoid a physical contact with the item 212. In a different example, the supplement module 960 can determine the supplement 210 as urgent view 240 based on the supplement 210 requiring an immediate attention from the operator 246 of the item 212 but nevertheless not make a physical contact with the item 212 even if the avoidance maneuver is not taken.

For a specific example, the supplement module 960 can determine the current vehicle position 310 of the vehicle 204 and the physical location 242 of the supplement 210 based on the traffic cone of FIG. 2 as the item 212. In this specific example, the supplement module 960 can compare the physical location 242 of the traffic cone and the path 218 predicted for movement of the vehicle 204. Continuing in this specific example, the supplement module 960 can determine the supplement 210 as the emergency 238 based on the overlap between the physical location 242 of the traffic cone and the predicted instance of the path 218 of the movement of the vehicle 204 unless the collision avoidance maneuver is taken by the vehicle 204. Alternatively, in the same specific example, the supplement module 960 can determine the supplement 210 based on the traffic cone as the urgent view 240 based on lack of overlap between the physical location 242 of the path 218 predicted for movement of the vehicle 204 and the traffic cone even if a collision avoidance maneuver is not taken.

The navigation system 100 can include an orientation module 970, which can couple to the supplement module 960. The orientation module 970 determines the orientation 236 of FIG. 2 of the navigation system 100.

The orientation module 970 can retrieve the orientation 236 of the route bar 256, the supplement 210, or a combination thereof. For example, the orientation module 970 can retrieve the orientation 236 from the operator 246 through the first user interface 818, the first storage unit 814, the second storage unit 846 through the first communication unit 816, or a combination thereof. For a specific example, the orientation module 970 can retrieve the orientation 236 of the route bar 256, the supplement 210, or a combination thereof based on retrieving the orientation 236 representing "vertical," "horizontal," or a specific angle for displaying.

The navigation system 100 can include a display module 980, which can couple to the orientation module 970. The display module 980 displays the route bar 256, the supplement 210, or a combination thereof of the navigation system 100.

The display module 980 can display the route bar 256 in various ways. For example, the display module 980 can display the route bar 256, the supplement 210, or a combination thereof by projecting the route bar 256, the supplement 210, or a combination thereof based on the orientation 236, the windshield 208, the safe location 232 or a combination thereof. In this example, the display module 980 can display the route bar 256 on the safe location 232 of the windshield 208 according to the orientation 236. For a specific example, the display module 980 can display the route bar 256, the supplement 210, or a combination thereof by displaying the route bar 256, the supplement 210, or a combination thereof using a Cathode Ray Tube (CRT) to display the route bar 256 on a phosphor screen as the windshield 208 according to the orientation 236.

In a different specific example, the display module 980 can display the route bar 256, the supplement 210, or a combination thereof using a solid-state light source, for example, an LED, modulated by an LCD screen to display on the windshield 208 according to the orientation 236. In another specific example, the display module 980 can display the route bar 256, the supplement 210, or a combination thereof on the windshield 208 using an optical wave guides to display the route bar 256, the supplement 210, or a combination thereof directly to the windshield 208 as the combiner according to the orientation 236.

In a further specific example, the display module 980 can display the route bar 256, the supplement 210, or a combination thereof based on the orientation 236 using a scanning laser on the windshield 208 as a clear transparent medium. The displaying of the route bar 256, the supplement 210, or a combination thereof is not limited to the technologies described above. For example, the route bar 256, the supplement 210, or a combination thereof can be displayed according to the orientation 236 using other technologies including the liquid crystal display (LCD), liquid crystal on silicon (LCoS), digital micro-mirrors (DMD), and organic light-emitting diode (OLED) as a light source to be projected on the windshield 208 as a screen, or displayed directly in the windshield 208 using the transparent emissive projection screen.

For illustrative purposes, the modules are shown in this embodiment to be operating in a sequential and linear fashion as depicted in FIG. 9, although it is understood that the navigation system 100 of FIG. 1 can operate differently. For example, a number of modules can be repeated or executed depending on the operation of the navigation system 100. As a specific example, the display module 970 can operate as a result of the route module 910. Also for example, the control flow can include loop back to other modules or feed forward bypassing the next shown sequential module.

Figure 10:
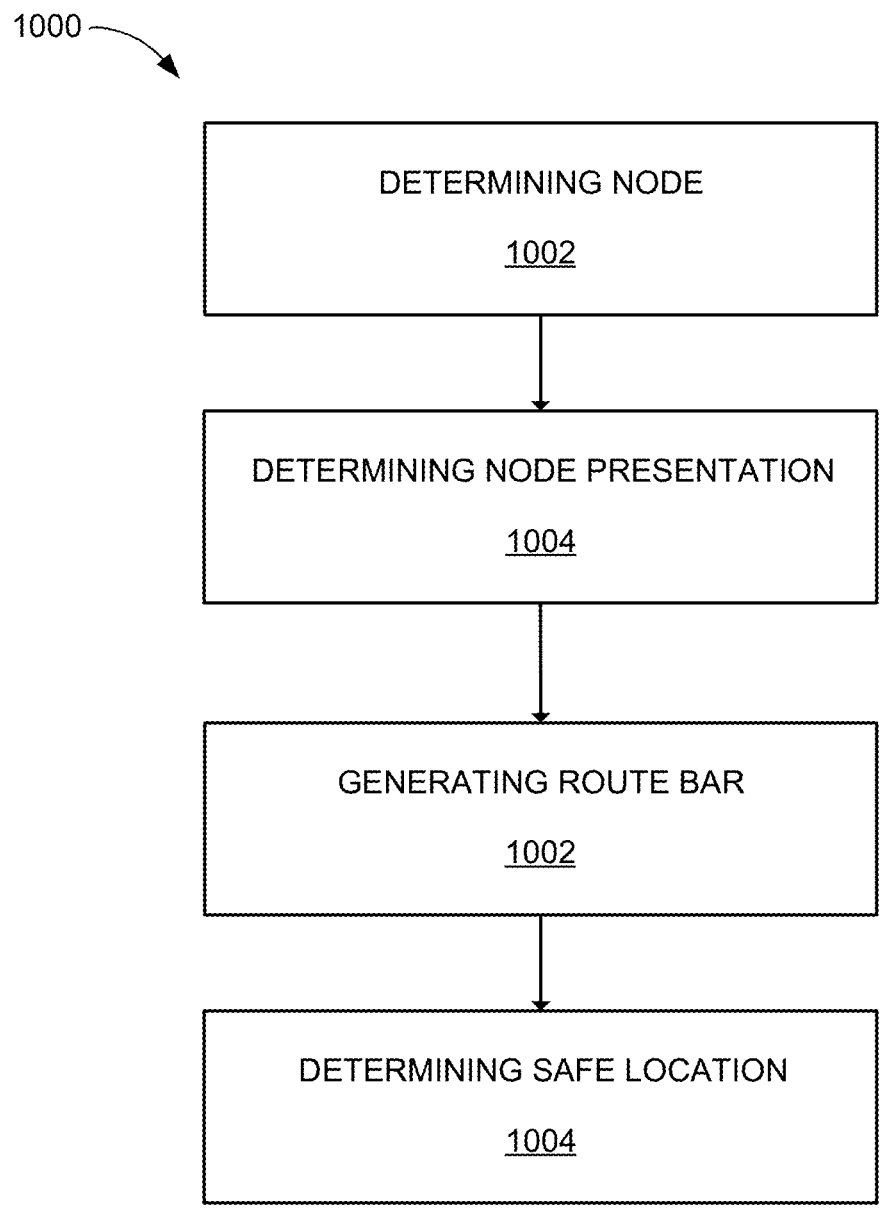
FIG. 10 is a flow chart of a method of operation of a navigation system in an embodiment of the present invention.

Referring now to FIG. 10, therein is shown a flow chart of a method 1000 of operation of a navigation system 100 in the embodiment of the present invention. The method 1000 includes: determining a node including a node attribute for a maneuver along a path; determining a node presentation based on the node attribute including a node proximity meeting or exceeding a node relevance threshold; generating a route bar including the node based on the node presentation, the node proximity, or a combination thereof determining a safe location with a control unit for displaying the route bar based on a current surrounding for presenting on a device.

The modules described in this application can be hardware implementation or hardware accelerators, including passive circuitry, active circuitry, or both, in the first storage unit 814 of FIG. 8, the second storage unit 846 of FIG. 8, the first control unit 812 of FIG. 8, the second control unit 834 of FIG. 8, or a combination thereof. The modules can also be hardware implementation or hardware accelerators, including passive circuitry, active circuitry, or both, within the first device 102 of FIG. 1, the second device 106 of FIG. 1, or a combination thereof but outside of the first storage unit 814, the second storage unit 846, the first control unit 812, the second control unit 834, or a combination thereof.

The navigation system 100 has been described with module functions or order as an example. The navigation system 100 can partition the modules differently or order the modules differently.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 814, the second storage unit 846, or a combination thereof can represent the non-transitory computer readable medium. The first storage unit 814, the second storage unit 846, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the movement of the first device 102 such as the movement by a person carrying the first device 102, the vehicle 204 equipped with the first device 102, or a combination thereof results in the movement in the physical world based on the operation of the navigation system 100. As the movement in the physical world occurs, the movement itself creates additional information that is converted back into generating the current vehicle position 310, the current street name indicator 306, the reachable range 370, the route bar 256, the supplement 210, the node proximity 724, or a combination thereof in dynamic and real-time from multiple instances of the second device 106 for the continued operation of the navigation system and to continue the movement in the physical world.

The first software 826 of FIG. 8 of the first device 102 of FIG. 8 can include the modules for the navigation system 100. For example, the first software 826 can include the route module 910, the operation mode module 920, the node module 930, the node attribute module 932, the node presentation module 934, the indicator module 940, the route bar module 950, the supplement module 960, the orientation module 970, and the display module 980.

The first control unit 812 of FIG. 8 can execute the first software 826 for the route module 910 to generate the navigation route 228. The first control unit 812 can execute the first software 826 for the operation mode module 920 to determine the operation mode 402. The first control unit 812 can execute the first software 826 for the node module 930 to determine the node 258. The first control unit 812 can execute the first software 826 for the indicator module 940 to generate the indicator 304. The first control unit 812 can execute the first software 826 for the route bar module 950 to generate the route bar 256. The first control unit 812 can execute the first software 826 for the supplement module 960 to determine the supplement 210. The first control unit 812 can execute the first software 826 for the orientation module 970 to determine the orientation 236. The first control unit 812 can execute the first software 826 for the display module 980 to display the route bar 256, the supplement, or a combination thereof.

The second software 842 of FIG. 8 of the second device 106 of FIG. 8 can include the modules for the navigation system 100. For example, the second software 842 can include the route module 910, the operation mode module 920, the node module 930, the node attribute module 932, the node presentation module 934, the indicator module 940, the route bar module 950, the supplement module 960, the orientation module 970, and the display module 980.

The second control unit 834 of FIG. 8 can execute the second software 842 for the route module 910 to generate the navigation route 228. The second control unit 834 can execute the second software 842 for the operation mode module 920 to determine the operation mode 402. The second control unit 834 can execute the second software 842 for the node module 930 to determine the node 258. The second control unit 834 can execute the second software 842 for the indicator module 940 to generate the indicator 304. The second control unit 834 can execute the second software 842 for the route bar module 950 to generate the route bar 256. The second control unit 834 can execute the second software 842 for the supplement module 960 to determine the supplement 210. The second control unit 834 can execute the second software 842 for the orientation module 970 to determine the orientation 236. The second control unit 834 can execute the second software 842 for the display module 980 to display the route bar 256, the supplement, or a combination thereof.

The modules of the navigation system 100 can be partitioned between the first software 826 and the second software 842. The second software 842 can include the node module 930, the indicator module 940, the route bar module 950, the supplement module 960, the orientation module 970, and the display module 980. The second control unit 834 can execute modules partitioned on the second software 842 as previously described.

The first software 826 can include the route module 910 and the operation mode module 920. Based on the size of the first storage unit 814, the first software 826 can include additional modules of the navigation system 100. The first control unit 812 can execute the modules partitioned on the first software 826 as previously described.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    determining a node including a node attribute for a maneuver along a path of a vehicle;
    determining a node presentation based on the node attribute including a node proximity meeting or exceeding a node relevance threshold;
    generating a route bar including the node based on the node presentation, the node proximity, or a combination thereof; and
    determining a safe location with a control unit for displaying the route bar based on a current surrounding for presenting on a device portion of the vehicle.

2. The method as claimed in claim 1 wherein determining the node including the node attribute for the maneuver includes determining the node for the maneuver based on a maneuver node along a navigation route, the maneuver node ahead of the vehicle, or a combination thereof.

3. The method as claimed in claim 1 further comprising generating a supplement for displaying on the safe location based on the current surrounding.

4. The method as claimed in claim 1 further comprising determining a view adjustment of the route bar based on an orientation.

5. The method as claimed in claim 1 wherein determining the node presentation includes determining the turn maneuver based on the node attribute of a maneuver node.

6. The method as claimed in claim 1 wherein determining the node presentation includes determining a free drive mode as an operation mode.

7. The method as claimed in claim 1 wherein determining the node presentation includes determining an autonomous driving mode as an operation mode.

8. The method as claimed in claim 1 wherein determining the node presentation includes determining a navigation mode as an operation mode.

9. The method as claimed in claim 1 further comprising generating the path attribute indicator based on the path attribute, the path condition, the path, or a combination thereof.

10. The method as claimed in claim 1 wherein determining the node presentation includes determining the node presentation based on a street name of a cross-street.

11. A navigation system comprising:
    a control unit configured to;
        determine a node including a node attribute for a maneuver along a path of a vehicle,
        determine a node presentation based on the node attribute including a node proximity meeting or exceeding a node relevance threshold,
        generate a route bar including the node based on the node presentation, the node proximity, or a combination thereof,
        determine a safe location for displaying the route bar based on a current surrounding for presenting on a device portion of the vehicle; and
    a communication interface, coupled to the control unit, for communicating the safe location for displaying on a device.

12. The system as claimed in claim 11 wherein the control unit is further configured to determine the node for the maneuver based on a maneuver node along a navigation route, the maneuver node ahead of the vehicle, or a combination thereof.

13. The system as claimed in claim 11 wherein the control unit is further configured to generate a supplement for displaying on the safe location based on the current surrounding.

14. The system as claimed in claim 11 wherein the control unit is further configured to determine a view adjustment of the route bar based on an orientation.

15. The system as claimed in claim 11 wherein the control unit is further configured to determining the turn maneuver based on the node attribute of a maneuver node.

16. A non-transitory computer readable medium including instructions for execution, the instructions comprising:
    determining a node including a node attribute for a maneuver along a path of a vehicle;
    determining a node presentation based on the node attribute including a node proximity meeting or exceeding a node relevance threshold;
    generating a route bar including the node based on the node presentation, the node proximity, or a combination thereof; and
    determining a safe location for displaying the route bar based on a current surrounding for presenting on a device portion of the vehicle.

17. The non-transitory computer readable medium as claimed in claim 16 wherein determining the node including the node attribute for the maneuver includes determining the node for the maneuver based on a maneuver node along a navigation route, the maneuver node ahead of the vehicle, or a combination thereof.

18. The non-transitory computer readable medium as claimed in claim 16 further comprising generating a supplement for displaying on the safe location based on the current surrounding.

19. The non-transitory computer readable medium as claimed in claim 16 further comprising determining a view adjustment of the route bar based on an orientation.

20. The non-transitory computer readable medium claimed in claim 16 wherein determining the node presentation includes determining the turn maneuver based on the node attribute of a maneuver node.

* * * * *